United States Patent
Hahn et al.

(10) Patent No.: US 8,582,771 B2
(45) Date of Patent: Nov. 12, 2013

(54) METHOD FOR SELECTIVELY ENCRYPTING CONTROL SIGNAL

(75) Inventors: Gene Beck Hahn, Anyang-Si (KR); Eun Jong Lee, Anyang-Si (KR); Yong Ho Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 12/557,267

(22) Filed: Sep. 10, 2009

(65) Prior Publication Data

US 2010/0067698 A1  Mar. 18, 2010

Related U.S. Application Data

(60) Provisional application No. 61/095,624, filed on Sep. 10, 2008, provisional application No. 61/095,956, filed on Sep. 11, 2008, provisional application No. 61/097,545, filed on Sep. 17, 2008, provisional application No. 61/146,320, filed on Jan. 22, 2009, provisional application No. 61/224,919, filed on Jul. 13, 2009.

(30) Foreign Application Priority Data

| Jan. 12, 2009 | (KR) | 10-2009-0002227 |
| Mar. 2, 2009 | (KR) | 10-2009-0017463 |
| Apr. 7, 2009 | (KR) | 10-2009-0029860 |

(51) Int. Cl.
*H04L 29/06* (2006.01)

(52) U.S. Cl.
USPC .......................................................... 380/270

(58) Field of Classification Search
USPC .......................................................... 380/270
See application file for complete search history.

(56) References Cited

U.S. PATENT DOCUMENTS

| 5,299,263 | A | 3/1994 | Beller et al. |
| 6,778,828 | B1 | 8/2004 | Chander et al. |
| 7,457,629 | B2 | 11/2008 | Jang et al. |
| 2002/0034945 | A1 | 3/2002 | Hamada |
| 2003/0088769 | A1 | 5/2003 | Quick, Jr. et al. |

(Continued)

FOREIGN PATENT DOCUMENTS

| CN | 1913701 A | 2/2007 |
| CN | 1951038 A | 4/2007 |

(Continued)

OTHER PUBLICATIONS

Christos Xenakis, Lazaros Merakos, Security in third Generation Mobile Networks, Dec. 2, 2003, communication Networks Laboratory, University of Athens, pp. 641-644.*

(Continued)

*Primary Examiner* — Kambiz Zand
*Assistant Examiner* — Ali Shayanfar
(74) *Attorney, Agent, or Firm* — Birch Stewart Kolasch & Birch, LLP

(57) ABSTRACT

Various methods and apparatus for encrypting signals in a wireless access system are disclosed. A method for selectively encrypting a management message in an MS includes steps of generating a Medium Access Control Protocol Data Unit (MAC PDU) including the selectively encrypted management message and an Fragmentation Extended Header (FEH) and transmitting the MAC PDU to the BS. The FEH includes indication information indicating whether the management message was encrypted.

12 Claims, 12 Drawing Sheets

(56) References Cited

U.S. PATENT DOCUMENTS

| | | |
|---|---|---|
| 2003/0177267 A1 | 9/2003 | Orava et al. |
| 2005/0003806 A1 | 1/2005 | Bazin et al. |
| 2005/0050352 A1 | 3/2005 | Narayanaswami et al. |
| 2005/0192011 A1 | 9/2005 | Hong et al. |
| 2005/0208940 A1 | 9/2005 | Takase et al. |
| 2006/0111105 A1 | 5/2006 | Bajar et al. |
| 2007/0026858 A1 | 2/2007 | Mizukoshi |
| 2007/0160208 A1* | 7/2007 | MacLean et al. ............. 380/210 |
| 2007/0167161 A1 | 7/2007 | Cheng et al. |
| 2007/0211653 A1 | 9/2007 | Mizukoshi |
| 2008/0032702 A1 | 2/2008 | Cone |
| 2008/0080409 A1 | 4/2008 | Zhang et al. |
| 2008/0178994 A1 | 7/2008 | Qi et al. |
| 2009/0061869 A1 | 3/2009 | Bui et al. |
| 2009/0181643 A1* | 7/2009 | Thakare ........................ 455/411 |

FOREIGN PATENT DOCUMENTS

| | | |
|---|---|---|
| JP | 2001-169351 A | 6/2001 |
| JP | 2005-509384 A | 4/2005 |
| JP | 2005-267433 A | 9/2005 |
| JP | 2005-323401 A | 11/2005 |
| JP | 2007-43259 A | 2/2007 |
| JP | 2007-243807 A | 9/2007 |
| JP | 2008-190038 A | 8/2008 |
| KR | 10-2000-9947194 A | 7/2000 |
| KR | 10-2004-0028099 A | 4/2004 |

OTHER PUBLICATIONS

Barbeau, "WiMax/802.16 Threat Analysis." In: ACM Workshop on QoS and Security for Wireless and Mobile Networks, Oct. 13, 2005, Montreal, Quebec, Canada.

Madanapalli et al., "Transmission of IPv4 Packets over IEEE 802.16's IP Convergence Sublayer draft-ietf-16ng-ipv4-over-802-dot-16-ipcs-01.txt," IETF 16ng WG Internet-Draft, Nov. 18, 2007, pp. 1-10.

Saito et al., "Digital Baseband SoC for Mobile WiMAX Terminal Equipment," Fujitsu Scientific & Technical Journal, vol. 44, No. 3, Jul. 2008, pp. 227-236.

Menezes et al., "Handbook of Applied Cryptography", CRC Press, 2007, pp. 364-368 (7 pages provided).

* cited by examiner

FIG. 7
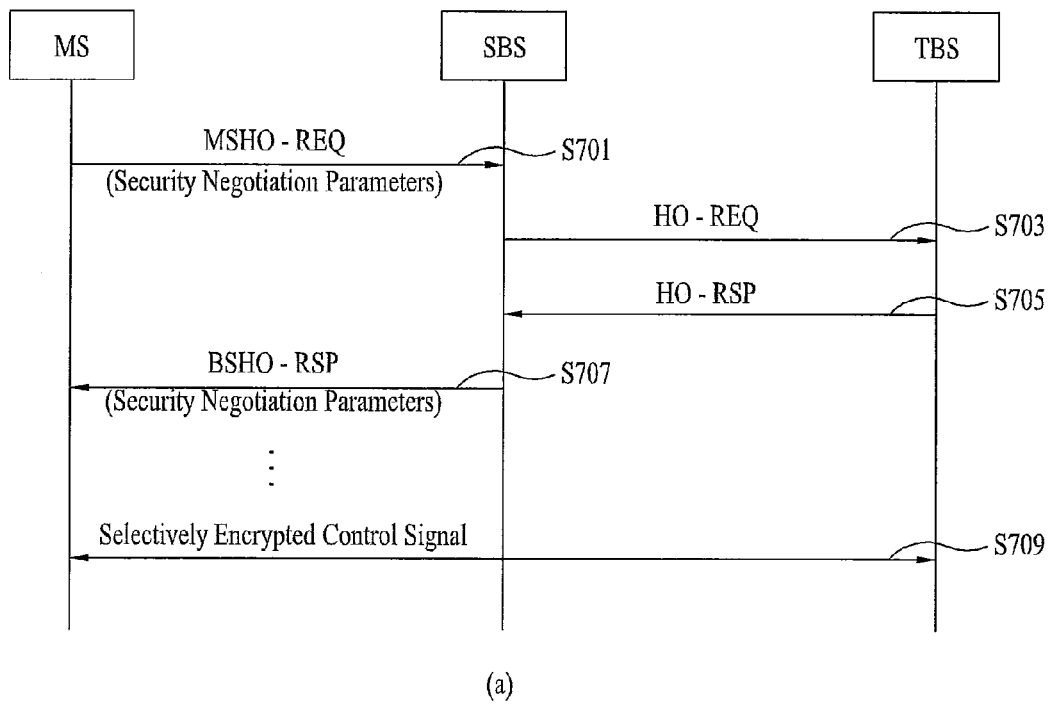
(a)
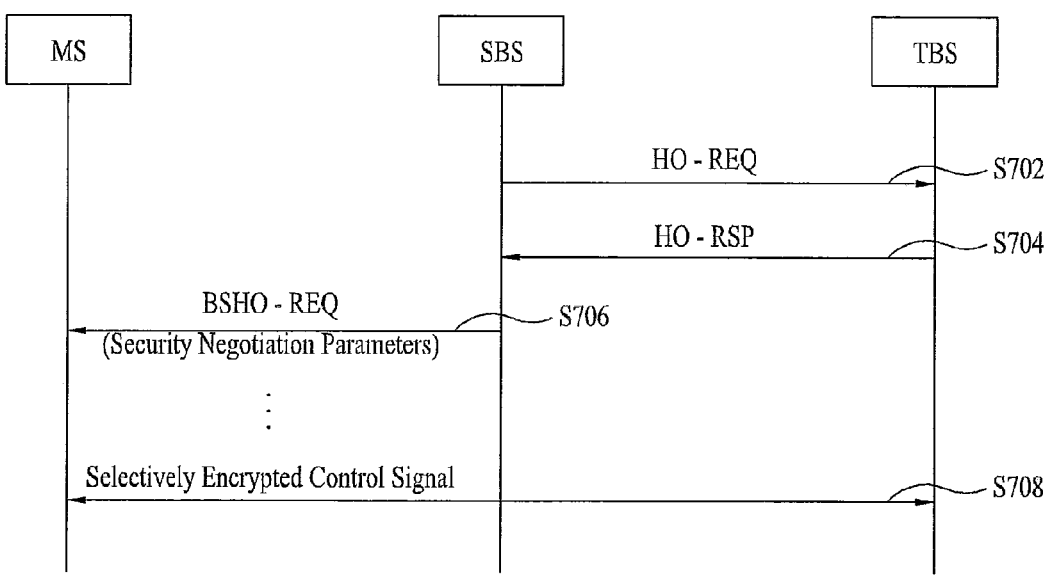
(b)

FIG. 12

| Last | Type(Length : TBD) [=Encryption Control] | TBD |
|---|---|---|

FIG. 13

| Last | Type (TBD) | FI=1 | EC | SN(2) |
|---|---|---|---|---|
| SN(6) | | | | FC(2) |

(a)

| Last | Type (TBD) | FI=0 | EC | Rsvd.(TBD) |
|---|---|---|---|---|

| EC | SNI =1 | polling | FC(2) | SN(3) |
|----|--------|---------|-------|-------|
| SN(5) | | | Rsvd.(3) | |

(a)

| EC | SNI =0 | Rsvd.(6) |
|----|--------|----------|

| Last | Type(TBD) | FC(=01, 10 or 11) | EC |
|------|-----------|-------------------|-----|
| SN(8) | | | |

(a)

| Last | Type(TBD) | FC(=00) | EC |
|------|-----------|---------|-----|

(b)

METHOD FOR SELECTIVELY ENCRYPTING CONTROL SIGNAL

This application claims the benefit of U.S. Provisional Application Ser. Nos. 61/095,624, filed on Sep. 10, 2008, 61/095,956, filed on Sep. 11, 2008, 61/097,545, filed on Sep. 17, 2008, 61/146,320, filed on Jan. 22, 2009, and 61/224,919, filed on Jul. 13, 2009, the contents of which are hereby incorporated by reference herein in their entirety.

This application also claims the benefit of Korean Patent Application Nos. 10-2009-0002227, filed on Jan. 12, 2009, 10-2009-0017463, filed on Mar. 2, 2009, and 10-2009-0029860, filed on Apr. 7, 2009, which are hereby incorporated by reference as if fully set forth herein.

BACKGROUND OF THE INVENTION

1. Field of the Invention

The present invention relates to various methods for encrypting signals in a wireless access system.

2. Discussion of the Related Art

A security sublayer used for a broadband wireless access system will be described in brief.

A security service provides confidentiality (security) and integrity for network data. Integrity means that specific information can be accessed or modified by an authorized user only in data and network security. In particular, the integrity secures a message not to be randomly modified by a third party. And, confidentiality means that specific information is opened to authorized persons only. That is, the confidentiality perfectly protects contents of transferred data to prevent an unauthorized person from accessing the contents.

The security sublayer provides security, authentication, and confidentiality in a broadband wireless network. The security sublayer may apply an encryption function to Medium Access Control Protocol Data Units (MAC PDUs) transmitted between a Mobile Station (MS) and a Base Station (BS). Therefore, the BS and the MS may provide a powerful defense capability against a service theft attack of an illegal user.

The BS performs encryption on a service flow across a network to prevent a data transfer service from an unauthorized access. The security sublayer controls the BS to distribute key-related information to an MS using a key management protocol of an authenticated client/server structure. In doing so, the BS may further reinforce the function of the basic security mechanism by adding digital certificate-based MS device authentication to the key management protocol.

During a basic capabilities negotiation in progress between the BS and the MS, if the MS does not provide the security function, authentication and key exchange procedures are not performed. Moreover, although the MS is registered as not supporting an authentication function, the BS may consider that the authority of the MS has been verified. If the MS dos not support the security function, a service is not provided to the MS. Hence, a key exchange or data encryption function is not performed.

The security sublayer includes an encapsulation protocol and a Privacy Key Management (PKM) protocol. The encapsulation protocol was designed to ensure the security of packet data in the broadband wireless network. The encapsulation protocol provides a set of cryptographic suites such as data encryption and data authentication algorithms and a method for applying such algorithms to a MAC PDU payload. The PKM protocol may provide a method for safely distributing key-relevant data to the MS from the BS. The use of the PKM protocol enables the BS and the MS to share the key-relevant data and the BS to control network access.

SUMMARY OF THE INVENTION

The present invention relates to a method for selectively protecting control signals between an MS and a BS in a wireless access system.

In an Institute of Electronics and Electrical Engineers (IEEE) 802.16e system, an MS and a BS may generate a Cipher based Message Authentication Code (CMAC) key and a Hashed Message Authentication Code (HMAC) key using an authorization key shared between them, for protecting control signals. Each of the MS and the BS may generate a message authentication code (called MAC) using the CMAC key and/or the HAMC key. That is, the MS and the BS exchange control signals each attached with a MAC to thereby secure the integrity of the control signals. Meanwhile, in the case where the BS and the MS employ Advanced Encryption Standard-Counter with Cipher block chaining Message authentication code (AES-CCM), the MS and the BS may guarantee the integrity of control signals by attaching Integrity Check Values (ICVs) to the control signals and exchanging them.

Although the MS and the BS protect message integrity using the CMAC key and/or the HMAC key, the message authentication code does just provides a decision as to whether the message has been forged or falsified, not providing message confidentiality. Therefore, the Message Authentication Code (MAC) does not provide a hiding function for the messages.

Legacy wireless access systems including the IEEE 802.16e system provide the hiding function for general messages, but not for control signals.

That is, the IEEE 802.16e system supports integrity for control signaling, but not confidentiality for the control signaling. Since a control signal having only a CMAC/HMAC attached is transmitted, it may become a security threat and system protection may become vulnerable to malicious attacks in the legacy wireless access systems.

Yet, if it is regulated that confidentiality is uniformly provided to all control signals, this may increase a network load and decrease the overall efficiency of the system.

Further, the IEEE 802.16e system basically considers to use many encryption algorithms that do not support integrity (e.g. AES Counter (AES-CTR)) and AES-CCM supporting both integrity and confidentiality. Therefore, there exists a need for considering algorithms that selectively protect the confidentiality of control signals. Accordingly, the present invention is directed to various methods for selectively supporting confidentiality for control signals that substantially obviates one or more problems due to limitations and disadvantages of the related art.

An object of the present invention is to provide a method for selectively protecting control signals transmitted between an MS and a BS.

Another object of the present invention is to provide a method for selectively protecting a control signal by use of encryption control fields (e.g. Encryption Control (EC), Encryption Key Sequence (EKS), etc.) defined in a Generic MAC Header (GMH) and/or an Fragmentation Extended Header (FEH).

Another object of the present invention is to provide a method for selectively protecting a control signal by use of a Flow Identifier (ID), a Flow ID Type, and/or a Management Flow ID.

A further object of the present invention is to provide a method for explicitly indicating whether a PDU includes a selectively encrypted control signal by a FEH. That is, it may be determined whether a management message was encrypted from an EC bit included in a Security Extended Header (SEH) and/or a Fragmentation Extended Header (FEH) being a kind of EH.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

The present invention provides various methods and apparatus for encrypting signals in a wireless access system and, more particularly, various methods and apparatus for selectively encrypting management messages (e.g. control signals).

To achieve these objects and other advantages and in accordance with the purpose of the invention, as embodied and broadly described herein, a method for selectively encrypting a management message in an MS includes the steps of generating a Medium Access Control Protocol Data Unit (MAC PDU) including the selectively encrypted management message and an Fragmentation Extended Header (FEH); and transmitting the MAC PDU to the BS. The FEH includes indication information indicating whether the management message was encrypted.

The method further comprising the steps of negotiating a protection level with a BS, and selectively encrypting the management message according to the negotiated protection level. In this case, the management message may be a MAC management message.

The protection level for selectively encryption of the management message can be previously determined by a type of the management message or use timing. If the encryption is not applied, the integrity can be supported by attaching the CMAC to the management message.

The step of the protection level negotiation may include steps of transmitting a first message including a first security negotiation parameter supported by the MS to the BS, and receiving a second message including a second security negotiation parameter supported by the BS from the BS. The first message may be one of a Subscriber Station Basic Capability-REQuest (SBC-REQ) message, a ranging request message, and a handover request message and the second message may be one of a Subscriber Station Basic Capability-ReSPonse (SBC-RSP) message, a ranging response message, and a handover response message.

The first security negotiation parameter may include a field indicating a first message confidentiality mode supported by the MS and the second security negotiation parameter may include a field indicating a second message confidentiality mode supported by the BS.

The method may further include an authorization procedure with the BS. Here, the MAC PDU including the selectively encrypted management message and the FEH may be transmitted after the authorization procedure. And, it is preferable that the selectively encrypted MAC management message is transmitted after performing the authorization procedure and a TEK generation for encryption procedure.

The selective encryption may include encrypting the management message, and attaching an Integrity Check Value (ICV) to the encrypted management message.

Alternatively, the selective encryption may include generating a message authentication code by hashing the management message, and attaching the message authentication code to the encrypted management message.

The indication information may include an EC field indicating whether the management message was encrypted.

In another aspect of the present invention, a method for selectively encrypting a management message in a BS includes negotiating a protection level with an MS, selectively encrypting the management message according to the negotiated protection level, and transmitting a MAC PDU including the selectively encrypted management message and an Fragmentation Extended Header (FEH) to the MS. The FEH may include indication information indicating whether the management message was encrypted.

The protection level negotiation may include receiving a first message including a first security negotiation parameter supported by the MS from the MS, and transmitting a second message including a second security negotiation parameter supported by the BS to the MS. The first message may be one of an SBC-REQ message, a ranging request message, and a handover request message and the second message may be one of an SBC-RSP message, ranging response message, and handover response message. Also, the first security negotiation parameter may include a field indicating a first message confidentiality mode supported by the MS and the second security negotiation parameter may include a field indicating a second message confidentiality mode supported by the MS and the BS.

The method may further include performing an authorization procedure with the MS and the MAC PDU including the selectively encrypted management message and the FEH may be transmitted after the authorization procedure.

The selective encryption may include encrypting the management message, and attaching an ICV to the encrypted management message.

The selective encryption may include generating a message authentication code by hashing the management message, and attaching the message authentication code to the encrypted management message.

The indication information may include an EC field indicating whether the management message was encrypted.

In a further aspect of the present invention, an MS for transmitting and receiving selectively encrypted MAC management messages includes a transmission module for transmitting first MAC data including a first selectively encrypted management message and a first FEH, a reception module for receiving second MAC data including a second selectively encrypted management message and a second FEH, and a processor for encrypting the first management message and decrypting the second management message. The first FEH and the second FEH may include indication information indicating whether the first and second management messages were encrypted, respectively.

The processor may include an encryption module for selectively encrypting the first management message, and a decryption module for decrypting the second management message.

The processor may encrypt the first management message and attach an ICV to the encrypted management message. Also, the processor may generate a message authentication code by hashing the management message and attach the message authentication code to the encrypted management message.

The foregoing aspects of the present invention are merely part of preferred embodiments of the present invention and thus it is to be understood to those skilled in the art that various embodiments reflecting the technical aspects of the present invention can be implemented based on the following detailed description of the present invention.

As is apparent from the above description, the embodiments of the present invention offer the following effects.

Firstly, control signals (i.e. MAC management messages) transmitted between an MS and a BS can be selectively protected.

Secondly, it is clearly defined whether the management message is selectively encrypted using a header with an encryption control field (e.g. EC or EKS), such as a GMH and/or an FEH.

Thirdly, control signals can be selectively protected using various types of flow IDs.

Fourthly, an excessive load imposed on a whole network can be reduced by selectively encrypting control signals, compared to encryption of all control signals.

Fifthly, since control signals are transparently transmitted due to selective control signal encryption, security problems such as information disclosure can be prevented. Also, the selectively encrypted control signals can be safely transmitted. Therefore, the control signals can be protected against a security threat from a malicious third party.

It will be appreciated by persons skilled in the art that that the effects that could be achieved with the present invention are not limited to what has been particularly described hereinabove and the above and other advantages of the present invention will be more clearly understood from the foregoing detailed description taken in conjunction with the accompanying drawings. That is, effects that are not intended in the application stage of the present invention can be derived from embodiments of the present invention by those having ordinary skills in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a signal flow for a method for selectively encrypting control signals during handover.

FIG. 12 illustrates a Security Extended Header (SHE) format that can be used in embodiments of the present invention.

FIG. 13 illustrates an exemplary FEH that can be used in embodiments of the present invention.

FIG. 14 illustrates another exemplary FEH that can be used in embodiments of the present invention.

FIG. 15 illustrates another exemplary FEH that can be used in embodiments of the present invention.

DETAILED DESCRIPTION OF THE INVENTION

Figure 1:
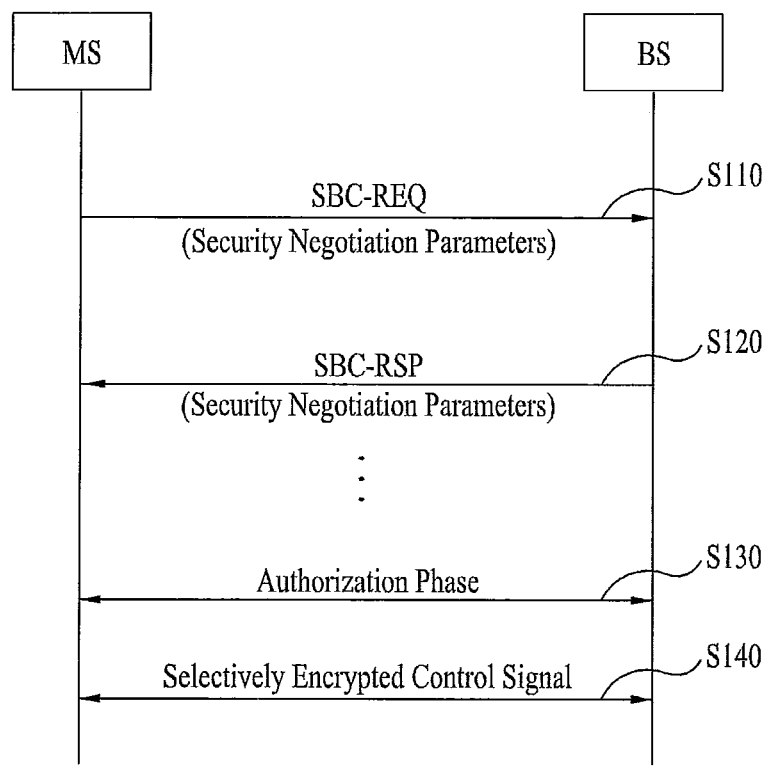
FIG. 1 is a diagram illustrating a signal flow for a negotiation procedure for selectively protecting control signals.

The present invention provides various methods for selectively encrypting control signals in a wireless access system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B' (eNB), 'Advanced BS (ABS)', or 'access point', etc. The term 'MS' may be replaced with the term 'User Equipment (UE)', 'Mobile Subscriber Station (MSS)', 'Advanced MS (AMS)', or 'mobile terminal', etc.

A transmitter means a node that transmits voice or data service and a receiver means a node that receives voice or data service. Hence, an MS may be a transmitter and a BS may be a receiver, on uplink. Likewise, the MS may be a receiver and the BS may be a transmitter, on downlink.

Embodiments of the present invention are supported by standard documents disclosed for at least one of wireless access systems including Institute of Electronics and Electrical Engineers (IEEE) 802 systems, a $3^{rd}$ Generation Project Partnership (3GPP) systems, a 3GPP Long Term Evolution (LTE) systems, and a 3GPP2 system. In particular, the steps or parts, which are not described to clearly reveal the technical idea of the present invention, in the embodiments of the present invention may be supported by the above documents.

All terminologies used herein may be supported by at least one of P802.16-2004, P802.16e-2005, P802.16Rev2 and P802.16m documents which are the standards of IEEE 802.16.

Now a detailed description will be made of preferred embodiments of the present invention with reference to the accompanying drawings. The following detailed description presented with reference to the accompanying drawings is intended to describe not only embodiment of the present invention but exemplary embodiments of the present invention.

Specific terms used for the embodiments of the present invention are provided to help the understanding of the present invention. These specific terms may be replaced with other terms within the scope and spirit of the present invention.

For instance, the term 'control signal' used in embodiments of the present invention can be replaced with the terms 'control message', 'management message', 'MAC control message', 'MAC management message', or the like. In addition, the term 'Extended Header' used in embodiments of the present invention can be replaced with the term 'Fragmentation Extended Header (FEH)', 'Security Extended Header (SHE)', or the like.

In embodiments of the present invention, data confidentiality means protection of data against unauthorized disclosure of information. The data confidentiality may be guaranteed by data encryption. Encryption is the process of converting data transmitted between a transmitter and a receiver to a form that is not identifiable by a third party. For the encryption, an encryption algorithm and an encryption key are needed.

Among encryption algorithms adopted in a wireless access technology, the IEEE 802.16e standards, Advanced Encryption Standard-Counter with Cipher block chaining Message authentication code (AES-CCM) basically includes a message authentication function in itself. One thing to note herein is that AES-CCM is not a common denominator for the entire encryption algorithms. In an IEEE 802.16m system under development, support of a confidentiality guarantee function is required to allow a BS and an MS to safely exchange control signals with each other after an authorization phase.

Accordingly, there exists a need for a solution for preventing disclosure of control signals transmitted between the BS and the MS without causing much load to a network. Therefore, embodiments of the present invention provide various methods for preventing breach of the confidentiality of control signals by encrypting the control signals using a Traffic Encryption Key (TEK) and then exchanging the encrypted control signals by the BS and the MS.

Now a detailed description will be made of methods for providing confidentiality for a control signal using an Encryption Control (EC) field and methods for providing confidentiality for a control signal using the EC field and an Encryption Key Sequence (EKS) field according to embodiments of the present invention.

In the case where the BS and the MS use only an EC field having a predetermined number of bits, the BS may indicate whether confidentiality is provided and whether encryption is selectively performed, using the EC field only. For instance, for a 1-bit EC field, if the EC field is set to '0', it indicates that a control signal is not encrypted. If the EC field is set to '1', it indicates that the control signal is selectively encrypted and thus confidentiality is provided for the control signal.

In the case where both an EC field and an EKS field are used, the EC field may indicate whether the payload of a control signal is encrypted. In this case, the EKS field may provide a key sequence representing the protection level of the control signal.

In another aspect of the present invention, confidentiality may be provided for a control signal by a flow identifier (Flow ID) only. For instance, if the Flow ID indicates Transport Type, the control signal (or a management message) is not encrypted. Yet, if the Flow ID indicates Management Type, it indicates that the control signal (or the management message) is encrypted.

The EC field and/or the EKS field may be replaced with another field for performing the same function. That is, the EC field and/or the EKS field may be used interchangeably with any field indicating whether a control signal is selectively encrypted, or with modifications. Moreover, the EC field and/or the EKS field may be included in a Generic MAC Header (GMH) or another control signal (or control message) header (e.g. FEH).

According to embodiments of the present invention, the Flow ID and the encryption control fields may be used in combination. For instance, a combination of the Flow ID and the EC field or a combination of the Flow ID and the EKS field may indicate whether a control signal is encrypted. In case of a transport Flow ID, for example, a Security Association (SA) is mapped to the flow ID so that the SA is applied to all data of the flow ID.

On the other hand, in the case of a management Flow ID, all control signals with the flow ID, to which an SA is mapped, are not encrypted. Instead, encryption is selectively applied according to the EC field and/or the EKS field. That is, the MS may determine whether a management message has been encrypted by checking header information according to the type of the management message.

After an authorization phase between the BS and the MS and a Traffic Encryption Key (TEK) is generated, control signals between the BS and the MS may be selectively encrypted in embodiments of the present invention. In other words, the selective encryption of a control signal is valid after the authorization phase ends. In this case, each of the MS and the BS may selectively encrypt a control signal using an encryption key (e.g. TEK) agreed on between them.

For instance, the TEK is not activated during initial network entry prior to the authorization phase. Hence, although the selective control signal encryption is not supported during the initial network entry, once the BS and the MS set a TEK in the authorization phase, they may provide selective confidentiality for control signals using the TEK.

In addition, the BS and the MS may further secure message integrity by attaching a message authentication code to a control signal. Yet, if AES-CCM is applied to embodiments of the present invention, it is not necessary to include a message authentication code in a control signal because AEC-CCM itself provides message integrity protection.

For instance, only a message authentication code is included to support only the integrity of a control message, in the case where AES-CCM/AES-CTR is not used or in the case where only the integrity of a control message needs to be supported except for the case of not supporting either message integrity or confidentiality.

Among encryption algorithms adopted by the wireless access technology, the IEEE 802.16e standards, AES-CCM basically includes a message authentication function in itself. Yet, AES-CCM is not a common denominator for the whole encryption algorithms. In an IEEE 802.16m system under development, it is preferable that a confidentiality guarantee function is supported to enable an MS and a BS to safely exchange control signals with each other after an authorization phase.

That is, a solution for preventing disclosure of control signals transmitted between the MS and the BS without excessive load on the network is needed. Accordingly, embodiments of the present invention provide various methods for preventing breach of the confidentiality of control signals by selectively encrypting the control signals using an encryption key (e.g. TEK) agreed on between the MS and the BS and then exchanging the control signals by the MS and the BS.

Preferably, embodiments of the present invention aim at their application to an IEEE 802.16m system. For example, when an IEEE 802.16e MS is connected to an IEEE 802.16e BS, a control message is attached with a message encryption code only and transmitted between the MS and the BS after an authorization phase. Notably, the technical idea of the present invention is also applicable to an IEEE 802.16e system.

Meanwhile, when an IEEE 802.16m MS is connected to an IEEE 802.16m BS, the BS and the BS selectively encrypt control signals and exchange the selectively encrypted control signals with each other, thereby preventing unauthorized disclosure of the control signals. The selective encryption may be selectively applied to control signals after an authorization phase. Therefore, the selective encryption method may ensure the confidentiality of control signals, taking into account the load of the network and system efficiency. Also, the selective encryption method may enable safe delivery of a MAC management message.

In embodiments of the present invention, there is no need for newly defining a type field and an attribute field for a keying parameter in addition to a PKM Attribute Type parameter defined in the IEEE 802.16e standards. Also, embodiments of the present invention are based on the premise that data encryption algorithms as defined in the IEEE 802.16e standards are basically used for protecting control signals.

That is, a Cipher Block Chaining-Initialization Vector (CBC-IV) attribute is required when a control signal encryption algorithm ID in 'SA Ciphersuite' is 0x01 (e.g. Data Encryption Standard (DES) in CBC mode) or 0x03 (e.g. AES in the CBC mode). On the other hand, if the control signal encryption algorithm ID is 0x02 (e.g. AES), the CBC-IV attribute is not needed.

Table 1 below illustrates a cryptographic suite that can be used in embodiments of the present invention.

TABLE 1

| Type | Length | Value |
|---|---|---|
| 20 | 3 | A 24-bits integer identifying the cryptographic suite properties. The most significant byte, as defined in table 590, indicates the encryption algorithm and key length. The middle byte, as defined in Table 591 indicates the data authentication Algorithm. The least significant byte, as defined in Table 592, indicates the TEK Encryption Algorithm. |

Referring to Table 1, the TEK cryptographic suite is 24 bits in length and its Most Significant Bit (MSB) indicates an encryption algorithm and a key length. The middle byte of the TEK cryptographic suite indicates a data authentication algorithm and its Least Significant Bit (LSB) indicates a TEK encryption algorithm.

Table 2 illustrates allowed cryptographic suites that can be used in the present invention.

TABLE 2

| Value | Description |
|---|---|
| 0x000000 | No data encryption, no data authentication, no key encryption |
| 0x010001 | CBC Mode 56 bits DES, no data authentication and 3-DES, 128 |
| 0x000002 | No data encryption, no data authentication and RSA, 1024 |
| 0x010002 | CBC mode 56 bits DES, no data authentication and RSA, 1024 |
| 0x020003 | CCM mode AES, no data authentication and AES, 128 |
| 0x020103 | CCM mode 128 bit AES, CCM mode, 128 bit, ECB Mode AES with 128 bit key |
| 0x020104 | CCM mode 128 bit AES, CCM mode, AES key Wrap with 128 bit key |
| 0x030003 | CBC mode 128 bits AES, no data authentication, AES ECB mode with 128 bit key |
| 0x800003 | MBS CTR mode 128 bits AES, no data authentication, AES ECB mode with 128 bit key |
| 0x800004 | MBS CTR mode 128 bits AES, no data authentication, AES key Wrap with 128 bit key |
| All remaining values | reserved |

Table 1 illustrates the IEEE 802.16 cryptographic suite including TEK-related contents and Table 2 illustrates the allowed cryptographic suites.

Hereinbelow, a control signal encryption algorithm ID for encrypting a control signal, a control signal authentication algorithm ID for authenticating a control signal, and a TEK encryption algorithm ID will be described in embodiments of the present invention.

Table 3 below illustrates an exemplary format of a control signal encryption algorithm ID that can be used in embodiments of the present invention.

TABLE 3

| Value | Description |
|---|---|
| 0 | No control signaling protection |
| 1 | CBC mode, 56-bit DES |
| 2 | CCM mode, 128-bite AES |
| 3 | CBC mode, 128-bit AES |
| 4-127 | Reserved |
| 128 | CTR mode, 128-bit AES for MBS with 8 bit ROC |
| 129-255 | Reserved |

Referring to Table 3, if the control signal encryption algorithm ID is '0', this means that no control signal is protected. If the control signal encryption algorithm ID is '1', this indicates a 56-bit CBC mode. If the control signal encryption algorithm ID is '3', this indicates a 128-bit CBC mode. If the control signal encryption algorithm ID is '4' to '127', these values are reserved. If the control signal encryption algorithm ID is '128', this indicates a Counter Mode Encryption (CTR) mode. The remaining values 129 to 255 are reserved. It is preferable that using the AES-CCM for selectively encryption of the management message.

Table 4 below illustrates an exemplary format of a control signal authentication algorithm ID that can be used in embodiments of the present invention.

TABLE 4

| Value | Description |
|---|---|
| 0 | No control signaling authentication |
| 1 | CBC mode, 128-bite AES |
| 2-255 | Reserved |

Referring to Table 4, if the control signal authentication algorithm ID is '0', this implies that no control signaling authentication is supported. If the control signal authentication algorithm ID is '1', this indicates a 128-bit CBC mode for predetermined control signals.

Table 5 illustrates an exemplary format of a TEK encryption algorithm ID that can be used in embodiment of the present invention.

TABLE 5

| Value | Description |
|---|---|
| 0 | Reserved |
| 1 | 3-DES EDE with 128-bit key |
| 2 | RSA with 1024-bit key |
| 3 | ECB mode AES with 128 bits |
| 4 | AES key wrap with 128-bit key |
| 5-255 | Reserved |

Referring to Table 5, values of the TEK authentication algorithm ID, '0' and '5-255' are reserved. A TEK authentication algorithm ID of '1' indicates 3-Data Encryption Standard Encrypt-Decrypt-Encrypt (3-DES EDE), and a TEK authentication algorithm ID of '2' indicates a 1024-bit RSA. If the TEK authentication algorithm ID is '3', this indicates a 128-bit AES mode Electronic Code Book (ECB). If the TEK authentication algorithm ID is '4', this indicates a 128-bit AES key wrap.

<Selective Control Signal Encryption Support Negotiation>

Negotiation methods for encrypting a control signal selectively in an MS and a BS will be described.

FIG. 1 is a diagram illustrating a signal flow for a negotiation procedure for selectively protecting control signals.

Referring to FIG. 1, an MS may transmit a Subscriber Station Basic Capability REQuest (SBC-REQ) message to a BS to negotiate basic capabilities in step S110.

The SBC-REQ message may include security negotiation parameters. The security negotiation parameters may include a message confidentiality mode field for indicating an MS-supportable confidentiality mode for a control signal.

A security negotiation parameter that can be used in embodiments of the present invention will be described below. Table 6 illustrates an example of the security negotiation parameter.

TABLE 6

| Type | Length | Value | Scope |
|---|---|---|---|
| 25 | variable | The compound field contains the sub-attributes as defined in the table below | SBC-REQ, SBC-RSP |

The security negotiation parameters may include a sub-attribute field as a compound field. Table 7 below illustrates a sub-attribute of the security negotiation parameters.

TABLE 7

| Attribute | Contents |
|---|---|
| PKM Version Support | Version of privacy Sub-layer supported |
| Authorization Policy Support | Authorization Policy to Support |
| Message Authentication Code Mode | Message Authentication Code to support |
| Message Confidentiality Mode | Message Confidentiality to support |
| PN Window Size | Size of capability of the receiver PN window per SAID |
| PKM Flow Control | Maximum number of concurrent PKM transaction |

TABLE 7-continued

| Attribute | Contents |
|---|---|
| Maximum Number of Supported Security Association | Maximum number of supported SA |

Referring to Table 7, the security negotiation parameters may include a PKM version support parameter, an authorization policy support parameter, a message authentication code mode parameter, a message confidentiality mode parameter, a Pseudo Noise (PN) window size parameter, a PKM flow control parameter, and a parameter of a maximum number of supported SAs. The message confidentiality mode parameter indicates control message confidentiality supported by a current wireless access system.

Table 8 illustrates an exemplary format of the PKM version support parameter.

TABLE 8

| Type | Length | Value |
|---|---|---|
| 25.1 | 1 | Bit 0: PKM version 1<br>Bit 1: PKM version 2<br>Bit 2: PKM version 3<br>Bits 3-7: Reserved, shall be set to zero |

Referring to Table 8, embodiments of the present invention are based on the assumption that PKM version 3 is supported. Yet, PKM version 2 or PKM version 1 is also available as well as the PKM version 3.

Table 9 illustrates an exemplary format of the message confidentiality mode field used in step S110.

TABLE 9

| Type | Length | Value |
|---|---|---|
| 25.7 | 1 | Bit 0: No Message Confidentiality<br>Bit 1: Selective Message Confidentiality<br>Bits 27: Reserved, shall be set to zero |

Referring to Table 9, if the message confidentiality mode parameter is set to '1', it indicates that the message confidentiality mode is selectively supported. The MS may support at least one confidentiality mode. As in step S110, the MS may inform the BS of its supported message confidentiality mode by an SBC-REQ message.

Referring to FIG. 1 again, upon receipt of the SBC-REQ message, the BS may negotiate a security negotiation capability with the MS by transmitting an SBC-RSP message including BS-supportable security negotiation parameters. In particular, in step S120, the BS may negotiate a message confidentiality mode with the MS by transmitting security negotiation parameters including a message confidentiality mode field to the MS.

In FIG. 1, after completing the basic capabilities negotiation, the MS and the BS may perform an authorization phase in step S130.

The BS may selectively encrypt a control message based on the message confidentiality mode negotiated with the MS. In addition, the MS and the BS may exchange the selectively encrypted control message each other in step S140.

It may be further contemplated as another embodiment of the present invention that the MAC header of the control signal selectively encrypted in step S140 may include a Flow ID. As the Flow ID, a newly defined confidentiality Flow ID (CMF_ID) may be used. The MS may determine that the control signal has been encrypted by checking a Flow ID Type indicating CMF_ID.

Figure 2:
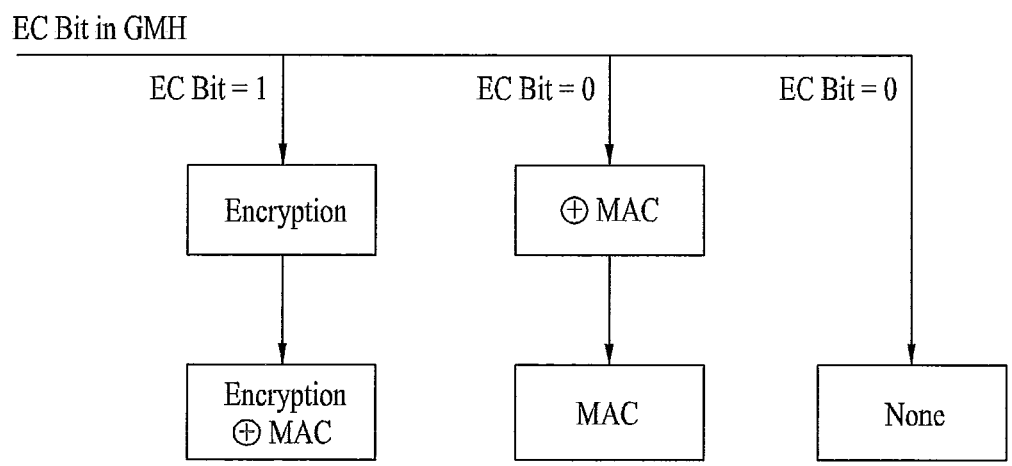
FIG. 2 illustrates a procedure for selectively encrypting control signals.

FIG. 2 illustrates a selective control signaling encryption procedure.

Referring to FIG. 2, if the Flow ID Type of a control signal is Transport Type, the encryption procedure illustrated in FIG. 2 is not used. On the other hand, if the Flow ID Type of the control signal is Management Type, the control signal may be subjected to selective encryption according to a control signal type identified by the flow ID.

Control signal types to which the selective encryption is applied may be classified basically based on the presence or absence of a CMAC. Also, the control signals to which the selective encryption is applied may be changed depending on when the individual control signals are used. The EC field of a GMH may be set to '1' according to the type of a control signal. Thus the control signal is encrypted according to the CMAC-based classification. In addition, the selective encryption and a CMAC/HMAC may be supported for the control signal.

Meanwhile, if the EC field of the GMH is set to '0', the encryption is not applied to the control signal according to the CMAC-based classification, and only a message authentication code is supported or no protection is supported for the control signal. The latter case corresponds to all control signals to which a CMAC is not applied.

Figure 3:
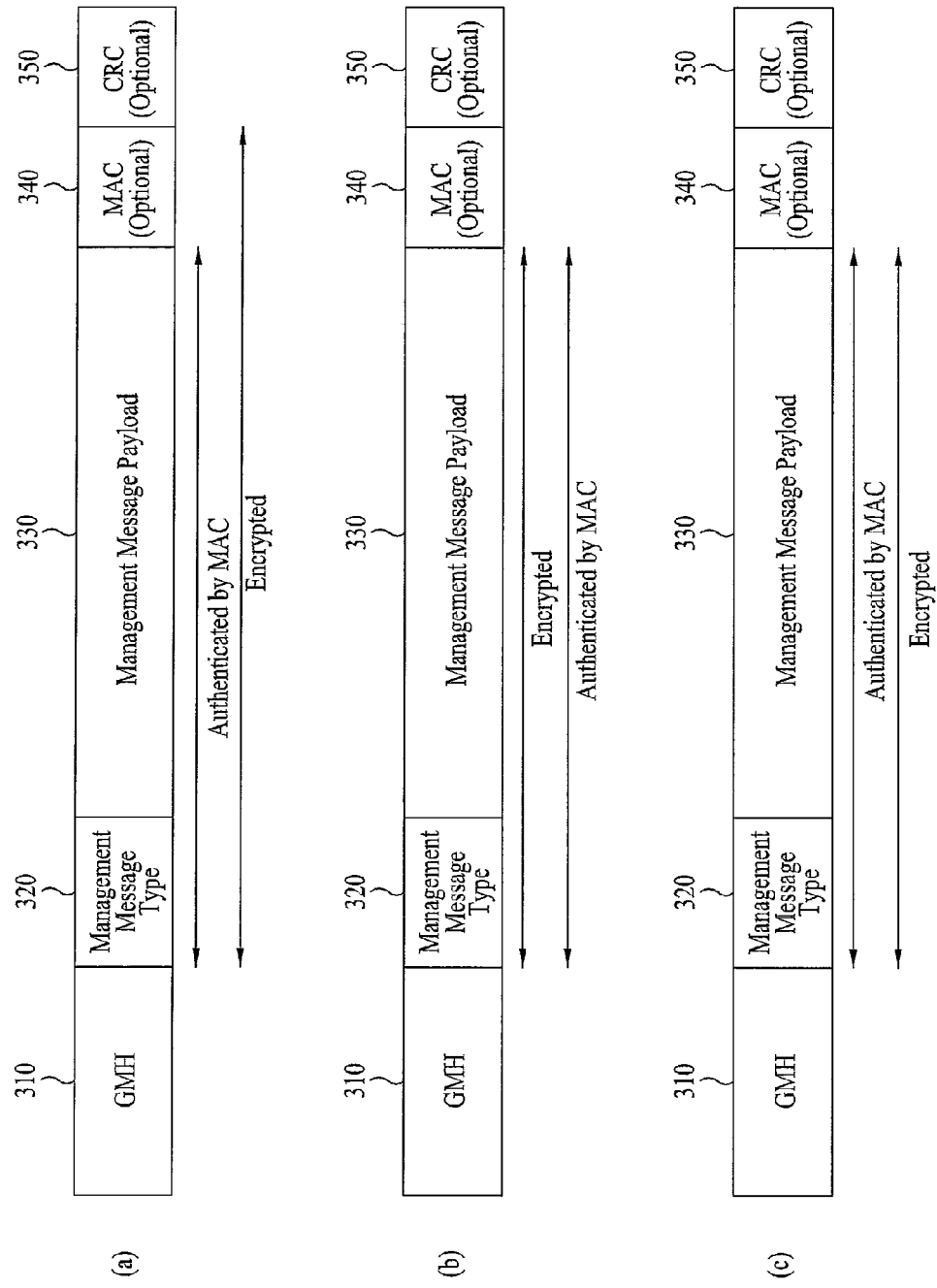
FIG. 3 illustrates a method for encrypting a Medium Access Control (MAC) management message.

FIG. 3 illustrates a method for encrypting a MAC management message.

A primary SA and a static SA as defined in IEEE 802.16e may be allocated according to the types of MAC management messages, for control signal protection. These classified MAC management messages may be encrypted in three ways by the BS, as illustrated in FIG. 3.

Referring to FIG. 3, a MAC management message may include a GMH 310, a Management Message Type field 320, and a Management Message Payload 330. The MAC management message may further include a Message Authentication Code (MAC) 340 and an optional Cyclic Redundancy Check (CRC) 350.

FIG. 3(a) illustrates a method for calculating the MAC 340 for the Management Message Type field 320 and the Management Message Payload 330 and then encrypting the Management Message Type field 320, the Management Message Payload 330, and the MAC 340 in a transmitter. A receiver then may decrypt the encrypted Management Message Type field 320, Management Message Payload 330, and MAC 340 and verify the MAC 340.

FIG. 3(b) illustrates a method for encrypting the Management Message Type 320 and the Management Message Payload 330 and then calculating the MAC 340 for the encrypted Management Message Type 320 and management message payload 330 in the transmitter. The receiver then may first verify the MAC 340 and then decrypt the encrypted Management Message Type 320 and Management Message Payload 330.

FIG. 3(c) illustrates a method for calculating the MAC 340 for the Management Message Type 320 and the Management Message Payload 330 and then encrypting the Management Message Type 320 and the Management Message Payload 330 in the transmitter. The receiver then may first decrypt the encrypted Management Message Type 320 and Management Message Payload 330 and then verify the MAC 340 for the Management Message Type 320 and Management Message Payload 330.

Figure 4:
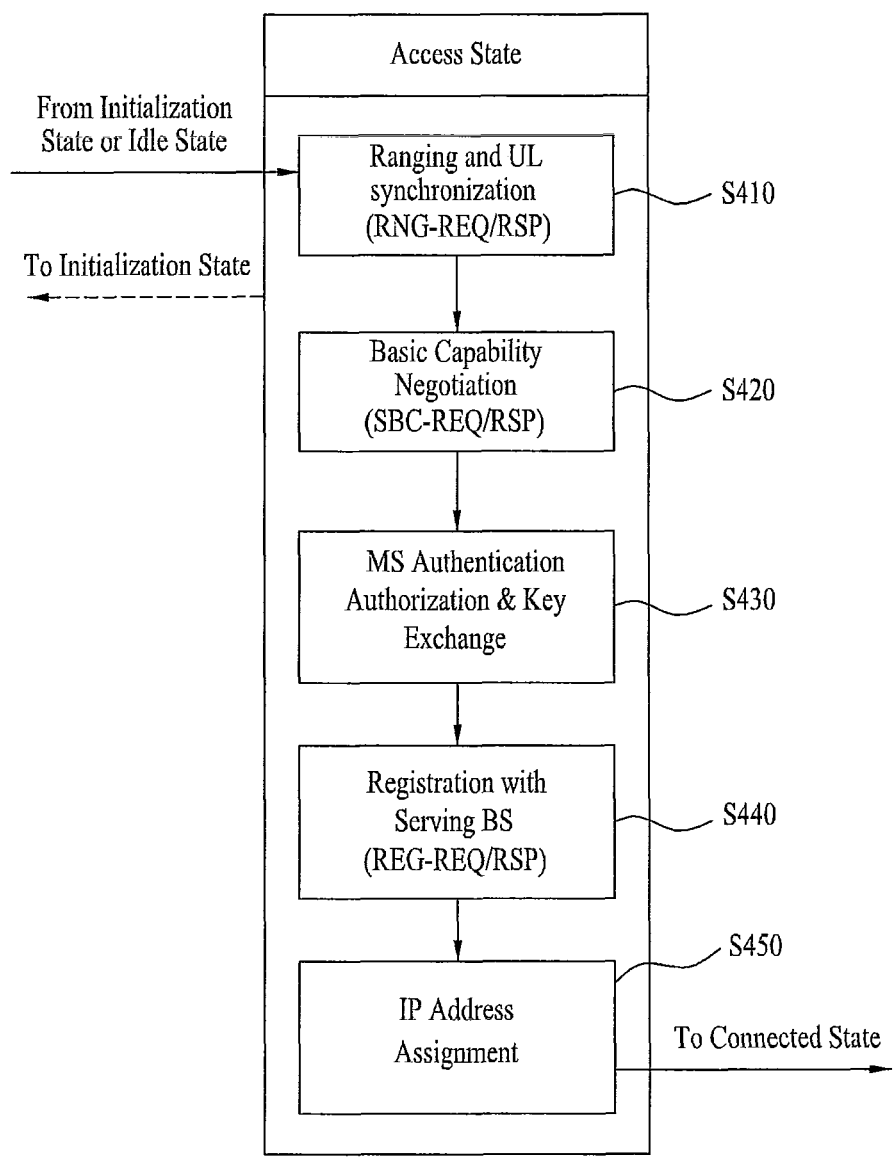
FIG. 4 is a state diagram illustrating a method for negotiating selective encryption of control signals in a Mobile Station (MS) in an initialization or idle state.

FIG. 4 is a state diagram illustrating a method for negotiating selective control signal encryption in an MS in an initialization state or an idle state.

An access state of the MS during a negotiation for selective protection of control signals is illustrated in FIG. 4. Referring to FIG. 4, the MS may transition from the initialization state or the idle state to the access state. In step S410, the MS performs a ranging procedure with the BS and acquire uplink synchronization with the BS.

The MS may perform a basic capability negotiation with the BS by exchanging an SBC-REQ message with an SBC-RSP message in step S420. In step S430, the MS may perform authentication and key exchange with the BS. After completion of the authentication procedure with the BS, the MS may register to the BS in step S440. In step S450, the MS may be allocated an Internet Protocol (IP) address from the BS. In FIG. 4, a negotiation on selective control signal encryption may be made between the BS and the MS in step S410 or S420.

Figure 5:
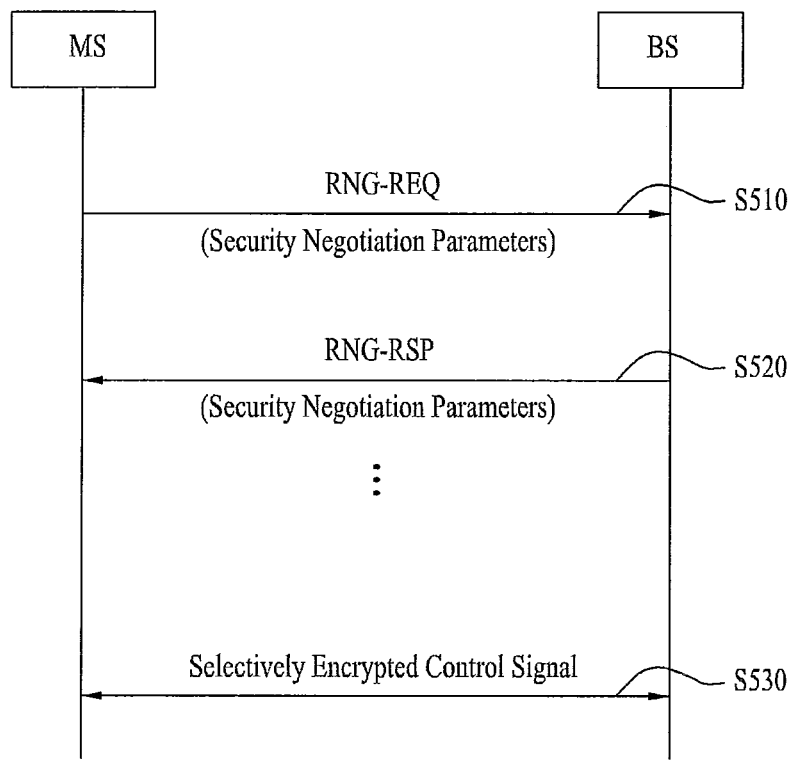
FIG. 5 is a diagram illustrating a signal flow for a negotiation procedure for selectively protecting control signals in the idle state.

FIG. 5 is a diagram illustrating a signal flow for a negotiation procedure for selectively protecting a control signal in the idle state.

An idle-state MS may also negotiate a method for selective control signal encryption with the BS. If the MS in the idle state moves to another BS and if a predetermined location update condition is met, the MS may conduct a location update process. In this case, the MS is able to perform a negotiation of selective confidentiality protection for control signals with the BS.

Referring to FIG. 5, the idle-state MS may transmit a Ranging Request (RNG-REQ) message including security negotiation parameters to the BS in step S510.

Upon receipt of the RNG-REQ message with the security negotiation parameters, the BS may reply with a Ranging Response (RNG-RSP) message including BS-supportable security negotiation parameters to the MS in step S520.

Reference may be made to the description of Table 6 to Table 9 for the security negotiation parameters transmitted in steps S510 and S520. Hence, the security negotiation parameters of step S510 may include a message confidentiality mode field indicative of an MS-supportable confidentiality mode for control signals. The security negotiation parameters of step S520 may include a message confidentiality mode field indicative of a BS-supportable confidentiality mode for control signals.

After completion of the selective confidentiality protection negotiation for control signals during location update process in steps S510 and S520, the BS and the MS may transmit and/or receive a selectively encrypted control message each other in step S530.

The MS may determine whether the received control signal was encrypted or not by decoding a header (e.g. fragmentation extended header) of the control signal. For example, the MS may determine whether the control message was encrypted by checking the EC field and/or the EKS field of the control message.

Moreover, the MS may selectively encrypt a control message based on the message confidentiality mode negotiated with the BS and transmit the selectively encrypted control message to the BS. A TEK used for selectively supporting the confidentiality of the control signal may be a new one created when the MS updates its location to a Target BS (TBS).

Figure 6:
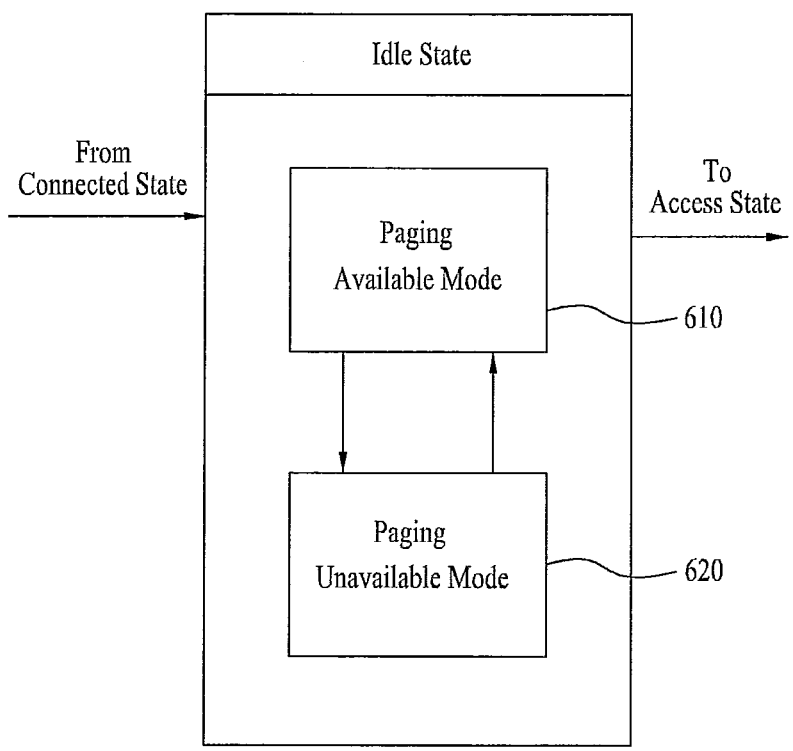
FIG. 6 illustrates a method for negotiating selective encryption of control signals in an idle-state MS.

FIG. 6 illustrates a method for negotiating selective control signal encryption in an idle-state MS.

Referring to FIG. 6, if a predetermined condition is met in a connected state, the MS may enter the idle state. The idle state can be categorized largely into a paging available mode and a paging unavailable mode. The paging available mode is set for a paging listening interval during which the MS receives a paging message from the BS, whereas the paging unavailable mode is set when the MS does not communicate with the BS.

The MS, which is in the idle state, may negotiate whether to support selective control signal protection with the BS by exchanging an RNG-REQ message with an RNG-RSP message during a location update (refer to FIG. 5). Also, the idle-state MS may negotiate support or non-support of selective control signal protection with the BS by a paging message (e.g. MOB_PAG-ADV) periodically or at predetermined intervals in the paging available mode.

Notably, in the case illustrated in FIG. 6, the MS unidirectionally receives information indicating support or non-support of protection of control signals that may be encrypted from the BS.

According to embodiments of the present invention, uniform provisioning of confidentiality to all control signals may increase an overall network load significantly or decrease overall system efficiency. In this context, encryption is applicable to predetermined control signals only in embodiments of the present invention.

Among MAC header fields, an EC field carries information needed for selective control signal protection. The EC field (and/or an EKS field) may explicitly indicate whether payload is encrypted. A Flow ID Type may indicate whether a message is in transport mode or management mode. That is, if a Flow ID represents the management type, values may be defined respectively to indicate support of both encryption and integrity, support of integrity only, and no support of either encryption or integrity.

The MS may be aware whether a received control signal was encrypted by checking the EC field of the control signal. Also, the MS may determine whether the control signal was encrypted by a combination of the EC and EKS fields of the control signal. The BS may also indicate whether the control signal is encrypted by a combination of the EC field and Flow ID of the control message. Also, the BS may indicate whether the control signal is encrypted, using a Flow ID according to a message type.

In other words, the MS may determine whether encryption is supported for a control signal by checking at least one of the EC field, the EKS field, and the message type of the Flow ID of the control signal. In step S140 illustrated in FIG. 1 or step S530 illustrated in FIG. 5, the MS may receive a selectively encrypted control signal.

For instance, the MS may find whether the control signal was encrypted from the EC field of the MAC header of the control signal. In another instance, the MS may determine whether the control signal was encrypted and the level of the encryption from a combination of the EC and EKS fields of the MAC header.

In a further embodiment of the present invention, the MS may determine whether the control signal was encrypted from the Flow ID Type field of the MAC header. In this case, a CF_ID may be defined as a flow ID for selective control signaling encryption. That is, if the CF_ID is included in the header of the control signal, the MS may be aware that the control signal was selectively encrypted.

FIG. 7 illustrates a method for selectively encrypting control signals during handover.

The message confidentiality mode negotiation methods according to embodiments of the present invention may also be performed during handover of an MS to a TBS. FIG. 7(a) illustrates an MS-initiated handover and FIG. 7(b) illustrates a BS-initiated handover.

Referring to FIG. 7(a), the MS may transmit a Mobile Station HandOver-REQuest (MSHO-REQ) message including security negotiation parameters (refer to Table 6 to Table 9) to a Serving BS (SBS) in step S701. The security negotiation parameters may include a message confidentiality mode which is able to be supported by the MS.

Upon receipt of the MSHO-REQ message, the SBS may generate a MAC request message or HandOver Request (HO-REQ) message including security-related information and transmit it to the TBS over a backbone network or via a Network Control and Management System (NCMS) in step S703. The NCMS is an upper entity of BSs and/or MSs. It may be incorporated in each BS and each MS, or operate externally.

In step S703, the security-related information may include information about MS-supportable security negotiation parameters (refer to Table 6 to Table 9). That is, a negotiation state of selective protection of control signal confidentiality or the message confidentiality mode of the MS may be notified to the TBS by the MAC request message or the HO-REQ primitive.

The HO-REQ primitive may further include an ID of the SBS (SBS_ID), a MAC address of the MS, an HO type, the number of BSs recommended by the MS or the SBS, a candidate TBS list, service flow information, etc.

Upon receipt of the HO-REQ primitive or the MAC message, the TBS may reply to the SBS with a MAC response message or HandOver Response (HO-RSP) message including supported security-related information over the backbone network or the NCMS in step S705.

The HO-RSP primitive may further include the MAC address of the MS, the HO type, the number BSs recommended by the MS or the SBS, and the recommended TBS list.

Upon receipt of the MAC response message or the HO-RSP primitive from the TBS, the SBS may transmit a BS HandOver ReSPonse (BSHO-RSP) message including TBS-supportable security negotiation parameters so that the MS is aware of the TBS-supportable security negotiation parameters in step S707.

Therefore, after the MS completes the handover to the TBS, that is, it is connected to the TBS, it may reliably transmit and/or receive selectively encrypted control signals from the TBS in step S709.

Upon receipt of the control signal, the MS may determine whether the control signal was encrypted by checking a Security Extended Header (SEH) in a MAC PDU including the control signal. The SHE may include information indicating whether the control signal was selectively encrypted (e.g. an EC field).

Referring to FIG. 7(b), when the SBS intends to initiate a handover, it may exchange security-related information with the TBS. That is, the SBS may transmit a MAC request message or an HO-REQ primitive including SBS-supportable security-related information to the TBS over the backbone network or the NCMS in step S702.

In step S704, upon receipt of the MAC request message or HO-REQ primitive, the TBS may transmit a MAC response message or HO-RSP primitive including TBS-supportable security-related information to the SBS.

The security-related information may include TBS-supportable security negotiation parameters (refer to Table 6 to Table 9). That is, a negotiation state of selective protection of control signal confidentiality or a message confidentiality mode supported by the TBS may be notified to the SBS by the MAC response message or the HO-RSP primitive.

The MAC response message or the HO-RSP primitive may further include a MAC address of the MS, an HO type, the number BSs recommended by the MS or the SBS, and a recommended TBS list.

Upon receipt of the MAC response message or the HO-RSP primitive from the TBS, the SBS may transmit a BSHO-RSP message including TBS-supportable security negotiation parameters so that the MS is aware of the TBS-supportable security negotiation parameters in step S706.

Therefore, after the MS completes the handover to the TBS, that is, it is connected to the TBS, it may reliably transmit and/or receive selectively encrypted control signals from the TBS in step S708.

Upon receipt of the control signal, the MS may determine whether the control signal was encrypted by checking an SEH in a MAC PDU including the control signal. The SEH may include information indicating whether the control signal was selectively encrypted (e.g. an EC field).

In step S708 or S709, aside from the EC field, the MS may determine whether the control signal was selectively encrypted by checking a Flow ID Type field.

That is, referring to FIG. 7, the MS and the TBS may negotiate selective support of control signal encryption by handover messages. Also, information about the message confidentiality mode of the MS may be transmitted from the SBS to the TBS by a backbone message.

<Selective Control Signal Encryption>

Figure 8:
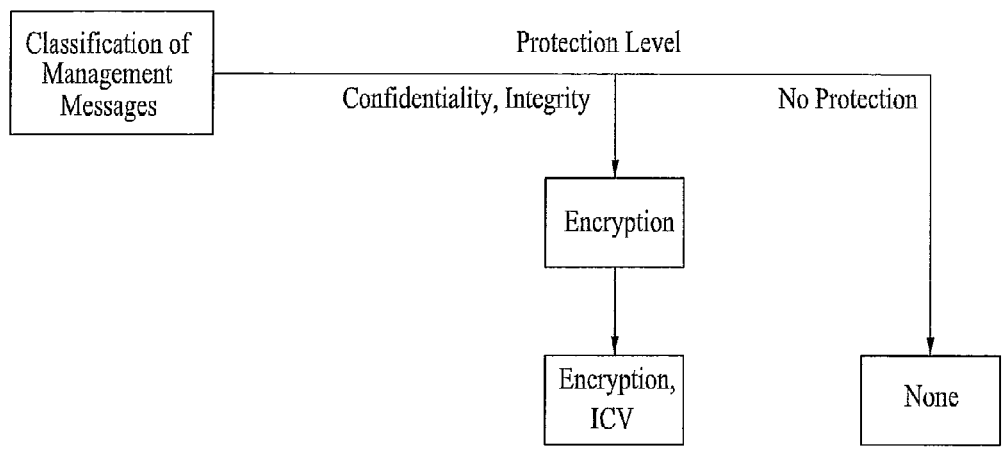
FIG. 8 illustrates one of methods for selectively encrypting control signals.

FIG. 8 illustrates one of methods for selectively encrypting a control signal.

In the illustrated case of FIG. 8, it is assumed that the MS and the BS employ AES-CCM as an encryption algorithm. AES-CCM itself is able to provide both integrity and confidentiality for a management message.

In FIG. 8, the EC field, the EKS field or the Flow ID Type field in the MAC header (or Fragmentation Extended Header) of a management message indicates whether selective encryption is applied to the management message. In this case, the EC field, the EKS field or the Flow ID Type field is able to represent a protection level of the selectively encrypted messages.

For instance, if the EC field is set to '1', it indicates that the management message is encrypted, for confidentiality protection and that an ICV is attached for integrity protection.

In this case, the BS and/or the MS may firstly encrypt payload to protect the confidentiality of the management message and then attach the ICV to protect the integrity of the management message.

If the EC field is set to '0', it indicates that no encryption is applied to the control signal.

In FIG. 8, the BS and/or the MS may indicate the protection level of the control message using the Flow ID Type field, instead of the EC field. For example, if the Flow ID Type field indicates CMF_ID, both confidentiality and integrity are guaranteed for the control message. On the other hand, if the Flow ID Type field indicates Primary Flow ID (PF_ID) or Secondary Flow ID (SF_ID), this means that no protection is supported for the control message.

If the Flow ID Type field is CMF_ID, the encryption for confidentiality protection may precede the ICV attachment for integrity protection of the encrypted result.

Figure 9:
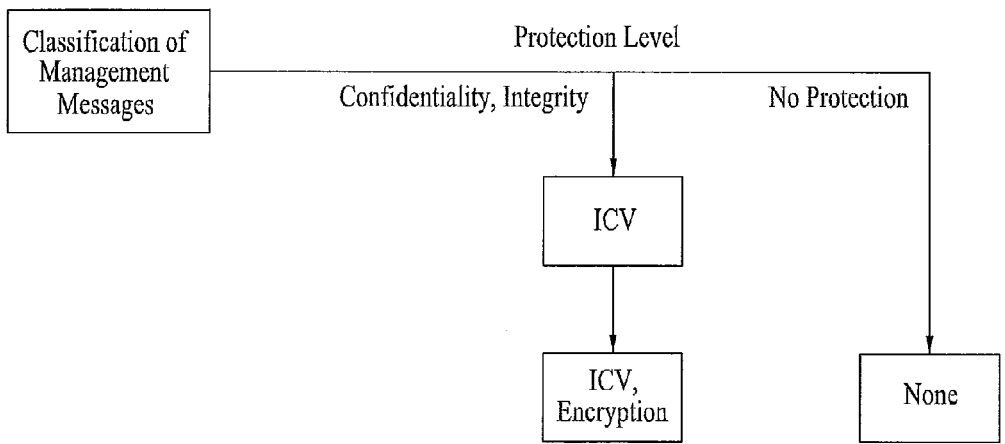
FIG. 9 illustrates another one of the methods for selectively encrypting control signals.

FIG. 9 illustrates another one of the methods for selectively encrypting a control signal.

The selective control signaling encryption is performed in a similar manner to that illustrated in FIG. 8, except that encryption for confidentiality protection and ICV attachment for integrity protection are performed in a different order from that of FIG. 8.

Referring to FIG. 9, if the EC field is set to '1', the BS and/or the MS attaches an ICV to payload to protect confidentiality of the management message and then encrypt the payload and the ICV for confidentiality protection.

In FIGS. 8 and 9, an encryption indication bit in the header (e.g. FEH) of the control signal is used to notify whether the control signal is encrypted. That is, the BS and/or the MS may indicate whether the control signal is encrypted using the EC field in the MAC header of the control signal.

According to another aspect of the present invention, the BS and/or the MS may use both the EC field and the EKS field of the MAC header (or FEH) together. In this case, the EC field indicates whether the control signal is encrypted and the EKS field indicates the protection level or encryption sequence of the control signal. For instance, if the EKS field is set to '00', it indicates that the control signal is not encrypted. If the EKS field is set to one of '01', '10' or '11', it indicates that the control signal is encrypted and an ICV is attached to the control signal. Also, the BS and/or the MS may indicate the sequence of the encryption and the ICV attachment by the EKS field.

In FIG. 9, the MS and the BS may also indicate whether a control signal is encrypted by a Flow ID Type field, aside from the EC field and/or the EKS field.

For example, if the Flow ID Type field indicates CMF_ID, the BS and/or the MS may first attach an ICV to the payload of the management message to protect integrity and then encrypt the payload and the ICV to protect confidentiality. That is, the ICV attachment may precede the encryption of the payload and the ICV.

Figure 10:
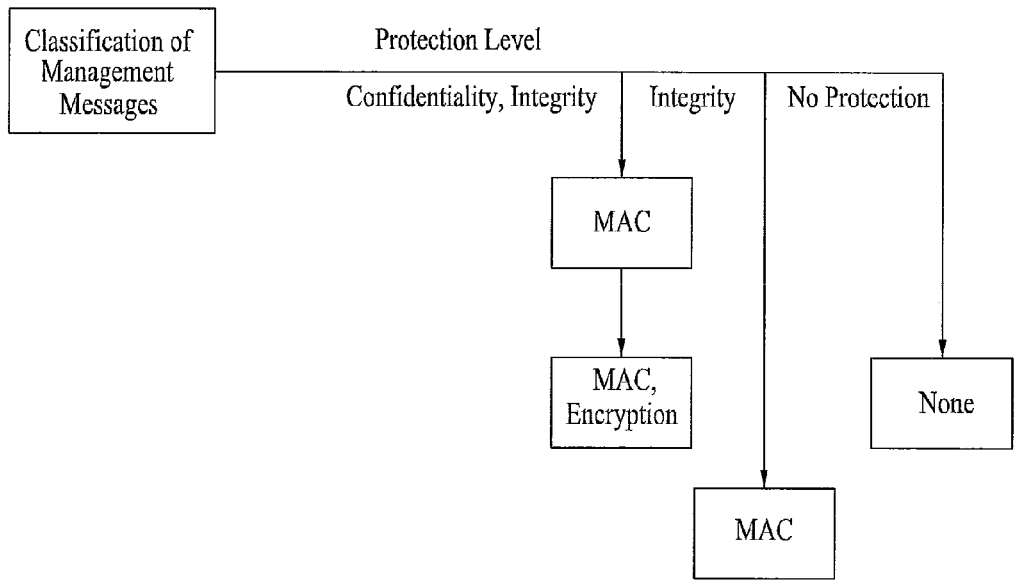
FIG. 10 illustrates another one of the methods for selectively encrypting control signals.

FIG. 10 illustrates another one of the methods for selectively encrypting a control signal.

In FIG. 10, AES-CTR is used instead of AES-CCM. The BS may protect integrity by attaching a message authentication code (MAC) to a signal or message by AES-CCM.

As stated before, only a message authentication code is included to support only the integrity of a control message, in the case where AES-CCM/AES-CTR is not used or in the case where only the integrity of a control message needs to be supported except for the case of not supporting either message integrity or confidentiality.

Referring to FIG. 10, the BS may protect confidentiality by selectively encrypting a management message and/or protect integrity by attaching a message authentication code. For instance, if the EC field in the header (e.g. Fragmentation Extended Header (FEH)) of the management message is set to '1', a message authentication code is firstly attached to the management message, for integrity protection and the management message is encrypted, for confidentiality protection.

In this case, the EC field is able to represent a protection level of the selectively encrypted messages.

For instance, the BS and/or the MS may firstly attach the message authentication code to the management message for integrity protection and then encrypt the payload of the management message and the message authentication code together for confidentiality protection.

If the EC field is set to '0', this means that the BS does not encrypt the management message but attaches the message authentication code, for integrity protection. In case of a control signal classified as not selectively encrypted, no protection may be guaranteed for the control signal.

Also in FIG. 10, the Flow ID Type field may be used to indicate whether the control signal is selectively encrypted. The Flow ID Type field may represent three protection levels.

For instance, if the Flow ID Type field is CMF_ID, this means that encryption for confidentiality protection and message authentication code attachment for integrity protection are performed. If the Flow ID Type field is PF_ID or SF_ID, this means that only a message authentication code is attached to the control message for integrity protection. If the Flow ID Type field is PF_ID or SF_ID and no protection is required, the control message is excluded from any protection.

That is, the BS may protect confidentiality by selectively encrypting a management message or protect integrity by attaching a message authentication code to the management message. For instance, if the Flow ID Type field is CMF_ID in the header of the management message, the BS attaches a message authentication code to the management message and then encrypts the payload and message authentication code of the management message.

If the Flow ID Type field of the header is PF_ID or SF_ID, the BS may attach the message authentication code to the management message without encrypting the management message. In this case, the management message attached with the message authentication code only may be transmitted in a primary flow or a secondary flow. As mentioned before, no protection may be guaranteed for a control signal classified as not selectively encrypted.

Figure 11:
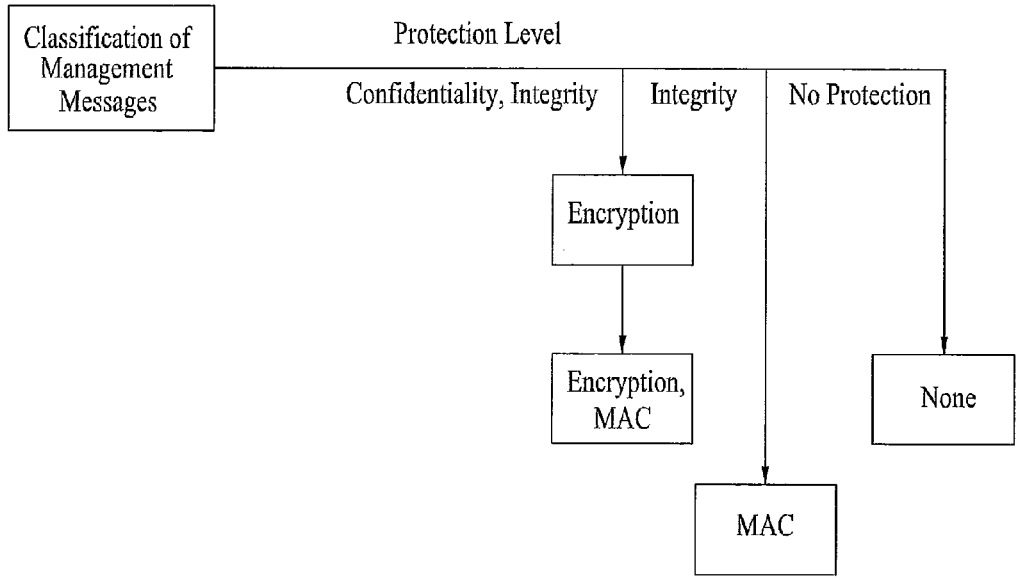
FIG. 11 illustrates a further one of the method for selectively encrypting control signals.

FIG. 11 illustrates another one of the methods for selectively encrypting a control signal.

The selective control signaling encryption is performed in a similar manner to that illustrated in FIG. 10, except that encryption for confidentiality protection and message authentication code attachment for integrity protection are performed in a different order from that of FIG. 10.

Referring to FIG. 11, if an EC field is set to '1', the BS and/or the MS may firstly encrypt the payload of a management message for confidentiality protection and then attach a message authentication code to the encrypted payload to protect integrity of the management message.

In FIGS. 10 and 11, the BS and/or the MS may indicate whether a control signal is encrypted using the EC field in the MAC header (or, FEH) of the control signal.

According to another aspect of the present invention, the BS and the MS may use both the EC field and the EKS field of the MAC header (or, FEH) together. In this case, the EC field indicates whether the control signal is encrypted and the EKS field indicates the protection level or encryption sequence of the control signal. For instance, if the EKS field is set to '00', it indicates that the control signal is not encrypted. If the EKS field is set to one of '01', '10' or '11', it indicates that the control signal is encrypted and a message authentication code is attached to the control signal. Also, the BS may indicate the sequence of the encryption and the MAC attachment by the bits of the EKS field.

In FIG. 11, the BS may also indicate whether the control signal is encrypted by a Flow ID Type field, aside from the EC field and/or the EKS field. For example, if the Flow ID Type field indicates CMF_ID, the BS may first encrypt the payload to protect confidentiality and then attach the message authentication code to the encrypted payload of the management message to protect integrity. That is, the encryption may precede the message authentication code attachment.

As described before, the encryption methods illustrated in FIGS. 8 to 11 are not viable when the Flow ID Type indicates the transport mode. In other words, only if the Flow ID Type indicates the management mode, selective encryption may be applied to a control signal according to a Flow ID set for encryption.

The protection level of the control signal which is applied to the selectively encryption can be previously determined depending on the type of the management message and use timing thereof.

If an encryption algorithm itself provides a message authentication function, such as AES-CCM, it guarantees both encryption and message authentication. Therefore, it is not necessary to add a CMAC/HMAC, as described with reference to FIGS. 8 and 9.

However, other general encryption algorithms do not have the message encryption function. As clarified with reference to FIGS. 10 and 11, thus, it is preferred that an encryption algorithm is applied and a CMA/HMAC is added. In the mean time, if the Flow ID of a control message is PF_ID or SF_ID and the control message is classified as not encrypted according to the presence or absence of a CMAC, only a message authentication code is supported or no protection is supported for the control message. In general communication technologies, no protection is supported for control signals without CMACs.

FIGS. 8 to 11 illustrate the selective encryption procedures for control signals based on predetermined protection levels according to the present invention. Preferably, control signals for which both confidentiality and integrity are protected are mapped to primary SAs in the procedures. Also, a CMAC and/or HMAC may be used as a message authentication code and an EC field may be used as an indicator indicating whether a control signal is selectively encrypted in FIGS. 8 to 11

<Control Signal Classification>

According to embodiments of the present invention, all control signals may not be encrypted. Rather, specific control signals may be selectively encrypted. For instance, only if a Flow ID Type indicates a management message, selective encryption is applied according to an individual control signal type under the same Flow ID.

According to embodiments of the present invention, the types of control signals, to which selective encryption is applied, may be classified according to whether a CMAC is included or the type of the management message. Moreover, the selective encryption is applicable according to time points when the control signals are used. In particular, the selective encryption is not applied to control signals during initial network entry prior to an authentication procedure.

If an encryption algorithm provides a message authentication function like the AES-CCM algorithm, encryption and message authentication are simultaneously performed. Therefore, a BS and/or a MS do not need to add a CMAC/HMAC to a specific control signal. Yet, although the AES-CCM algorithm is used, if message confidentiality is not required, integrity may be provided only by CMAC attachment. Since other encryption algorithms as defined in the standards of wireless access systems do not have the message authentication function, both the use of an encryption algorithm and addition of a CMAC/HMAC are required.

Meanwhile, if an EC field is set to '0' or an EKS field is set to '00', it indicates that a message authentication code is attached to a control signal requiring no encryption in order to protect integrity only (e.g. AES-CTR) or that no protection is supported (AES-CCM). Here, no protection is supported for all control signals without a CMAC.

Table 10 illustrates the type of MAC management messages (or MAC control signals) requiring a CMAC Tuple.

TABLE 10

| Type | Length | Value Scope |
|---|---|---|
| 141 | 13 or 19 | DSx-REQ/RSP/ACK, REG-REQ/RSP, RES-CMD, DREG-CMD/REQ, TFTP-CPLT, MOB_SLP-REQ/RSP, MOB_SCN-REQ/RSP, MOB_BSHO-REQ/RSP, MOB_MSHO-REQ, MOB_HO-IND, MOB_MIH-MSG, RNG-REQ/RSP, SBC-REQ/RSP |

From Table 10, the types of MAC management messages requiring a CMAC Tuple are noted. That is, the MAC management messages to which selective encryption is applied to according to embodiments of the present invention are known from Table 10. Therefore, the BS may selectively perform encryption on the control signals listed in Table 10.

Table 11 illustrates CMAC Tuple value fields applied to embodiments of the present invention

TABLE 11

| Field | Length (bits) | Notes |
|---|---|---|
| Reserved | 4 | Set to 0 |
| Key Sequence Number | 4 | AK sequence number |
| BSID | 48 | Only used in case of MSHO zone-optional |
| CMAC Packet Number Counter | 32 | This context is different UL, DL CMAC with AES-128 |
| CMAC_PN_*CMAC value | 64 | |

Referring to Table 10 and Table 11, application of the authentication tuple is limited to several management control signals. Among them, management control signals protected by a CMAC Tuple may be limited to several MAC messages.

For instance, MAC management messages for which integrity should be protected with CMAC-based authentication tuples may be categorized into MAC management messages requiring encryption and MAC management messages requiring no encryption. In particular, among the control signals defined in IEEE 802.16e, basically control signals without a CMAC tuple may not be encrypted. Among control signals with a CMAC tuple, messages related to ranging, handoff, a reset command, MIH, and TFTP may not be encrypted but other messages related to registration, PKM, basic capability negotiation, idle state entry, dynamic service generation, handoff request, and scanning request may be encrypted. According to embodiments of the present invention, control messages subjected to selective encryption may vary according to their types or time instances when they are used.

Table 12 illustrates an example of control signals with a HMAC tuple, subjected to encryption and control signals without an HMAC Tuple

TABLE 12

| Scope | Encryption shall be supported | Encryption shall be not supported |
|---|---|---|
| DSx-REQ/RSP/ACK, REG-REQ/RSP, RES-CMD, DREG-CMD/REQ, TFTP-CPLT, MOB_SLP-REQ/RSP, MOB_SCN-REQ/RSP, MOB_BSHO-REQ/RSP, MOB_MSHO-REQ, MOB_HO-IND, MOB_MIH-MSG | DSx-REQ/RSP/ACK, REG-REQ/RSP, DREG-CMD/REQ, MOB_SLP-REQ/RSP, MOB_SCN-REQ/RSP, MOB_BSHO-REQ/RSP, MOB_MSHO-REQ, MOB_HO-IND | RES-CMD, TFTP-CPLT, MOB_MIH-MSG |

Referring to Table 12, MAC management messages for which integrity is protected are divided into those to be encrypted and those not to be encrypted according to whether an HMAC is included.

Table 13 illustrates an example of control signals with a CMAC Tuple, subjected to encryption, and control signals without a CMAC Tuple.

TABLE 13

| Scope | Encryption shall be supported | Encryption shall be not supported |
|---|---|---|
| DSx-REQ/RSP/ACK, REG-REQ/RSP, RES-CMD, DREG-CMD/REQ, TFTP-CPLT, MOB_SLP-REQ/RSP, MOB_SCN-REQ/RSP, MOB_BSHO-REQ/RSP, MOB_MSHO-REQ, MOB_HO-IND, MOB_MIH-MSG, RNG-REQ/RSP, SBC-REQ/RSP | DSx-REQ/RSP/ACK, REG-REQ/RSP, DREG-CMD/REQ, MOB_SLP-REQ/RSP, MOB_SCN-REQ/RSP, MOB_BSHO-REQ/RSP, MOB_MSHO-REQ, MOB_HO-IND, RNG-REQ/RSP, SBC-REQ/RSP | RES-CMD, TFTP-CPLT, MOB_MIH-MSG |

Referring to Table 13, MAC management messages for which integrity is protected are divided into those to be encrypted and those not to be encrypted according to whether a CMAC is included.

Table 14 illustrates an example of control signals with a short HMAC Tuple, subjected to encryption, and control signals without a short HMAC tuple.

TABLE 14

| Scope | Encryption shall be supported | Encryption shall be not supported |
|---|---|---|
| MOB_SLP-REQ/RSP, MOB_SCN-REQ/RSP, MOB_BSHO-REQ/RSP, MOB_MSHO-REQ, MOB_HO-IND, RNG-REQ/RSP, SBC-REQ/RSP, PKM-REQ/RSP | MOB_SLP-REQ/RSP, MOB_SCN-REQ/RSP, MOB_BSHO-REQ/RSP, MOB_MSHO-REQ, MOB_HO-IND, RNG-REQ/RSP | PKM-REQ/RSP |

Referring to Table 14, MAC management messages for which integrity is protected are divided into those to be encrypted and those not to be encrypted according to whether a short HMAC is included.

As mentioned in the foregoing description, according to embodiments of the present invention, predetermined control signals (or MAC management messages) may be selectively encrypted. Thus, control signals to be encrypted need to be classified. Therefore, the BS and the MS may decide on control signals (or MAC management messages) requiring encryption, referring to Tables 10 to 14.

<Selective Control Signal Encryption Using Fragmentation Extended Header>

Methods for selectively encrypting a control signal using an FEH (Fragmentation Extended Header) according to a further embodiment of the present invention will be described in detail with reference to FIGS. 8 to 11 again.

FIGS. 8 to 11 illustrate selective encryption procedures for MAC management messages according to predetermined protection levels according to the present invention. Preferably, a selectively encrypted management message is mapped to a primary SA in every procedure performed according to embodiments of the present invention.

FIG. 8 illustrates an example of an AES-CCM algorithm is adopted. For the illustrated case of FIG. 8, two scenarios are available. One is that only some MAC management messages are selectively encrypted and the other is that no protection is supported.

In an IEEE 802.16e system, it is determined whether a management message is encrypted according to the Encryption Control (EC) field in Fragmentation Extended Header (FEH).

In addition, according to the other aspect of the present invention, it is determined whether the management message is selectively encrypted based on an Encryption Control Extended Header (EC EH) Type field in the EH.

For example, if the EC field (or, EC EH type field) is set, confidentiality and integrity are simultaneously supported for the management message. If the EC field (or, EC EH type field) is not set, no protection is supported for the management message. More specifically, it is preferred that encryption of the management message for confidentiality protection is preceded, and then an ICV attachment for integrity protection of the encrypted result of the management message.

FIG. 9 illustrates an example of an AES-CCM algorithm. For the illustrated case of FIG. 9, two scenarios are also available as in the illustrated case of FIG. 8. One is that only some MAC management messages are selectively encrypted and the other is that no protection is supported.

In FIG. 9, if the EC field which is included in the FEH is set, ICV attachment for integrity protection is accompanied by encryption of payload and the ICV for confidentiality protection in the management message.

FIG. 10 illustrates an example in which an AES-CCM algorithm is not used. For the illustrated case of FIG. 10, three scenarios are available. One is that some MAC management messages are selectively encrypted and attached with a message authentication code, another is that other MAC management messages are attached with a message authentication code only, and the other is that no protection is supported.

If the EC field (or. EC EH Type field) is set, confidentiality and integrity are simultaneously supported and if the EC field is not set, only integrity is supported. No protection is supported for MAC management messages classified as not selectively encrypted.

More specifically, when a management message is selectively protected, a message authentication code is attached to the management message, for integrity protection, and the payload and the message authentication code of the management message are encrypted, for confidentiality protection.

If the EC field is not set, the MS and/or the BS generates a message authentication code by hashing a MAC management message and then includes the message authentication code in the MAC management message, to thereby guarantee the integrity of the MAC management message.

In addition, both message authentication code attachment and payload encryption may be considered. Otherwise, only a message authentication code is attached to a management message, for integrity protection.

FIG. 11 illustrates an example in which an AES-CCM algorithm is not used. For the illustrated case of FIG. 11, three scenarios are also available as in the case of FIG. 10. One is that some MAC management messages are selectively encrypted and attached with a message authentication code, another is that other MAC management messages are attached with a message authentication code only, and the other is that no protection is supported.

In an IEEE 802.16e system, it is determined whether a management message is encrypted according to the presence or absence of a CMAC in the management message. Meanwhile, the determination is made based on the EC field in the FEH of the management message in an IEEE 802.16m system.

If an EC field is set in a MAC management message, confidentiality and integrity are simultaneously supported for the MAC management message and if the EC field is not set, only integrity is supported for MAC management message. No protection is supported for MAC management messages classified as not selectively encrypted.

In the case where selective protection is supported for a MAC management message (e.g. EC=1), the payload of the MAC management message is encrypted for confidentiality protection and then attached with a message authentication code.

If the EC field is not set (e.g. EC=0), the MS and/or the BS generates a message authentication code by hashing a MAC management message and includes the message authentication code in the MAC management message, to thereby guarantee the integrity of the MAC management message.

In addition, both payload encryption and message authentication code attachment may be considered for a management message. Otherwise, only a message authentication code is attached to the management message, for integrity protection. If no protection is considered for the management message, either the encryption or the message authentication code attachment is not performed for the management message.

As stated before, for a flow type of Transport, the procedures illustrated in FIGS. 8 to 11 are not required. Only for a flow type of Management, it is determined whether to selectively encrypt a management message included in a MAC PDU according to an EC field for encryption control.

The selective encryption of the management message is applied according to the type of the MAC PDU which includes the management message or the use timings. If an encryption algorithm provides a message encryption function in itself such as AES-CCM, encryption and message authentication are simultaneously supported. Thus, there is no need for adding a CMAC as illustrated in FIGS. 8 and 9. On the other hand, in case of other algorithms except for AES-CCM, such as AES-CTR, they do not have the message authentication function. Accordingly, it is preferred to apply an encryption algorithm and attach a CMAC, as illustrated in FIGS. 10 and 11.

Meanwhile, if an EC field is not set, only a message authentication code is supported or no protection is supported for management messages.

<Control Signal Classification> may be referred to for classification of management messages to which selective encryption is applied according to embodiments of the present invention.

FIG. 12 illustrates an exemplary EH that can be used in embodiments of the present invention.

Referring to FIG. 12, the EH may include a Last field and a Type field indicating an EH type. The Last field indicates whether there are one or more other EHs except for the current EH.

If the Type field includes encryption control information (e.g. an EC EH type), it may indicate that a management message is selectively encrypted. Therefore, the SEH may indicate whether a PDU includes a MAC management message that is encrypted based on its type and usage.

Transmission of the encryption control information indicating whether the MAC management message is encrypted takes at least 1-byte overhead.

It may further be contemplated as another embodiment of the present invention that the encryption control information is transmitted in a Fragmentation Extended header (FEH) instead of the SEH.

Table 15 below illustrates an exemplary FEH format used when the FEH is transmitted along with a MAC management message according to the present invention.

TABLE 15

| Syntax | Size (bit) | Notes |
|---|---|---|
| FEH ( ) { | — | |
| [EH] | 1 | Extended header indicator |
| FC | 2 | Fragmentation control (Table 21) |
| EC | 1 | Encryption Control indicator |
| | | 0 = Payload is not encrypted |
| | | 1 = Payload is encrypted |
| If (FC != 00) { | | If fragment(s) exists, this EH shall contain SN. |
| SN | 8 | Payload sequence number |
| } | | |
| Reserved | 4 | Reserved |
| } | — | |

Referring to the table 15, the FEH is able to be included at least one EH field, Fragmentation Control (FC) field, Encryption Control (EC) field, or Sequence Number (SN) field. If a MAC management message always includes an FEH, the FEH may be defined without the Last field and the EH type field.

In addition, if the FC field indicates the absence of a fragment management message, the FEH may not include a Sequence Number (SN) field in Table 15. If the FC field indicates the presence of a fragment management message, the FEH may include a SN field with a 1-byte.

Table 16 illustrates FEH fields included in the FEH illustrated in FIG. 15.

TABLE 16

| Name | Length (bit) | Description |
|---|---|---|
| [EH] | 1 | Extended header indicator should be '1', since this is the extended header |
| | | 0 = not extended header |
| | | 1 = extended header |
| EC | 1 | Encryption control indicator |
| | | 0 = Payload is not encrypted |
| | | 1 = Payload is encrypted |
| SN | 8 | MAC management fragment sequence number |
| FC | 2 | Fragmentation Control bits(Table 21) |
| Reserved | 4 | Reserved |

Referring to Table 16, the EH field indicates whether an EH exists. The EC field indicates whether encryption control is applied and the SN field indicates the sequence number of the MAC management fragment. The FC field indicates fragmentation control bits.

Table 17 illustrates another exemplary format of the FEH used when the FEH is transmitted along with a MAC management message.

TABLE 17

| Syntax | Size (bit) | Notes |
|---|---|---|
| FEH ( ) { | — | |
| [EH] | 1 | Extended header indicator |
| FI | 1 | Fragment indicator |
| EC | 1 | Encryption Control indicator |
| | 1 | 0 = Payload is not encrypted |
| | | 1 = Payload is encrypted |
| If (FIRST SCAN UNIT 130A == 1){ | | |
| SN | 8 | Payload sequence number |
| FC | 2 | Fragmentation control (Table 21) |
| } | | |

TABLE 17-continued

| Syntax | Size (bit) | Notes |
|---|---|---|
| Reserved } | variable — | Reserved |

Referring to the table 17, the FEH is able to include at least one EH field, Fragmentation Indicator (FI) field, Encryption Control (EC) field, Sequence Number (SN) field, or Fragment Control (FC) field.

In Table 17, the FEH may additionally deliver the SN field and the FC field by use of a 1-bit indicator (an FI field). That is, if the FI field is set to '1', the SN and FC fields are included in the FEH. If the FI field is set to '0', the SN field and the FC field are not included in the FEH.

Table 18 below illustrates FEH fields listed in Table 17.

TABLE 18

| Name | Length (bit) | Description |
|---|---|---|
| [EH] | 1 | Extended header indicator should be '1', since this is the extended header<br>0 = not extended header<br>1 = extended header |
| FIRST SCAN UNIT 130A | 1 | Fragmentation indicator |
| EC | 1 | Encryption control indicator<br>0 = Payload is not encrypted<br>1 = Payload is encrypted |
| SN | 8 | MAC management fragment sequence number |
| FC | 2 | Fragmentation Control bits (Table 21) |
| Reserved | 4 | Reserved |

In Tables 15 to 18, the EH field may be omitted.

Tables 19 and 20 illustrate FEH formats that can be used in embodiments of the present invention.

TABLE 19

| Syntax | Size (bit) | Notes |
|---|---|---|
| FEH ( ) { | — | |
|   LAST | 1 | Last Extended Header Indicator |
|   Type | TBD | Extended header type = FEH |
|   FI | 1 | Fragmentation indicator |
|   EC | 1 | Encryption Control indicator<br>0 = Payload is not encrypted<br>1 = Payload is encrypted |
|   If (FI == 1){ | | |
|     SN | 8 | Payload sequence number |
|     FC | 2 | Fragmentation control (Table 21) |
|   } | | |
|   Reserved | Variable | Reserved |
| } | — | |

TABLE 20

| Syntax | Size (bit) | Notes |
|---|---|---|
| FEH ( ) { | — | |
|   LAST | 1 | Last Extended Header Indicator |
|   Type | TBD | Extended header type = FEH |
|   FC | 2 | Fragmentation control (Table 21) |
|   EC | 1 | Encryption Control indicator<br>0 = Payload is not encrypted<br>1 = Payload is encrypted |

TABLE 20-continued

| Syntax | Size (bit) | Notes |
|---|---|---|
|   If (FC != 00){ | | |
|     SN | 8 | Payload sequence number |
|   } | | |
|   Reserved | Variable | Reserved |
| } | — | |

The FEHs of the table 19 and 20 can be used when the FEHs are not transmitted along with a MAC management message. If the MAC management message does not require an FEH, the FEH needs the Last and Type fields. If the FEH is transmitted only to indicate encryption control, transmission of only a 1-byte FEH suffices in embodiments of the present invention. On the other hand, if all fragmentation information is delivered in an FEH, it may be indicated whether an SN or SN/FC field is additionally included in the FEH by use of an FC or FI field.

If an FEH is not transmitted, this means that encryption is disabled and MAC message fragmentation does not occur. If encryption is enabled (i.e. the EC field is set to '1' and a 1-byte FEH is transmitted) despite no fragmentation, or if only fragmentation occurs (i.e. the EC field is set to '0' and a 2-byte FEH is transmitted), the FEH may be transmitted.

FIG. 13 illustrates an exemplary FEH that can be used in embodiments of the present invention.

FIG. 13(a) represents a FEH when the FI field is set to '1'. In this case, the FEH includes the Last field, type field, FI field, EC field, SN field, and FC field as 2 byte size.

FIG. 13(b) represents a FEH when the FI field is set to '0'. In this case, the FEH includes the Last field, type field, FI field, and EC field as 1 byte size.

FIG. 14 illustrates another exemplary FEH that can be used in embodiments of the present invention.

Referring to FIG. 14(a) FEH can be included EC field, Sequence Number Indicator (SNI) field, polling field, FC field, and SN field, as 2 byte size. FIG. 14(a) represents FEH field in case of the SNI field is set to '1'. Referring to FIG. 14(b), FEH can be included EC field and SNI field, as 1 byte size. FIG. 14(b) represents FEH filed in case of the SNI field is set to '0'.

Table 21 below illustrates another FEH format according to the present invention.

TABLE 21

| Syntax | Size (bit) | Notes |
|---|---|---|
| FEH( ){ | — | — |
|   EC | 1 | Encryption Control indicator<br>0 = Payload is not encrypted<br>1 = Payload is encrypted |
|   SN Indicator | 1 | 0 = no FC and sequence number<br>1 = FC and sequence number are followed |
|   If (SN Indicator = 0) { | | |
|     Reserved | 6 | For byte alignment |
|   else { | | |
|     Polling | 1 | 0 = no acknowledgement required<br>1 = acknowledge required upon receiving the MAC message |

TABLE 21-continued

| Syntax | Size (bit) | Notes |
|---|---|---|
| FC | 2 | Fragmentation control (see table 9) |
| SN | 8 | Payload sequence number |
| Reserved | 3 | For byte alignment |
| } | | |
| } | — | |

Referring to table 21, FEH can be included at least EC field, Sequence Number Indicator (SNI) field, polling field, FC field, or SN field. In this case, the EC field indicates whether the MAC management message is selectively encrypt, the SNI field indicates whether the FC field and the SN field is included in the FEH, and the polling filed indicates the acknowledgement for the MAC management is required or not.

FIG. 15 illustrates another exemplary FEH that can be used in embodiments of the present invention.

Table 22 illustrates an exemplary FC field used in the present invention.

TABLE 22

| FC | Meaning | Examples |
|---|---|---|
| 00 | The first byte of data in the MPDU payload is the first byte of a MAC SDU. The last byte of data in the MPDU payload is the last byte of a MAC SDU. | One or Multiple Full SDUs packed in an MPDU. |
| 01 | The first byte of data in the MPDU payload is the first byte of a MAC SDU. The last byte of data in the MPDU payload is not the last byte of a MAC SDU. | MPDU with only First fragment of an SDU. MPDU with one or more unfragmented SDUs, followed by first fragment of subsequent SDU. |
| 10 | The first byte of data in the MPDU payload is not the first byte of a MAC SDU. The last byte of data in the MPDU payload is the last byte of a MAC SDU. | MPDU with only Last fragment of an SDU. MPDU with Last fragment of an SDU, fool-lowed by one or more unfragmented subsequent SDUs. |
| 11 | The first byte of data in the MPDU payload is not the first byte of a MAC SDU. The last byte of data in the MPDU payload is not the last byte of a MAC SDU. | a) MPDU with only middle fragment of an SDU. MPDU with Last fragment of an SDU, followed by zero or more unfragmented SDUs, followed by first fragment of a subsequent SDU. |

Referring to table 22, if the FC field is 2 bits in size and set to '00' or '01', it indicates that the first byte of a MAC PDU is the first byte of a MAC SDU and the last byte of the MAC PDU is the last byte of the MAC SDU. If the FC field is set to '10' or '11', this means that the first byte of the MAC PDU is not the first byte of the MAC SDU and the last byte of the MAC PDU is not the last byte of the MAC SDU. For the values of the FC field, Table 22 above may be referred to.

FIG. 15(a) represents in case of the FC field is set to '01', '10' or '11'. In this case, the FEH includes Last field, type field, FC field and EC field, as 2 byte size. If the FC field is set to '00' in FIG. 15(b), the FEH comprises only the Last field, type field, FC field and EC field, as 1 byte size.

FIGS. 12 to 15 illustrate embodiments of the present invention. Therefore, the embodiments which are described FIGS. 12 to 15 are able to be applied to the other embodiments which are described in FIGS. 1 to 11.

Figure 16:
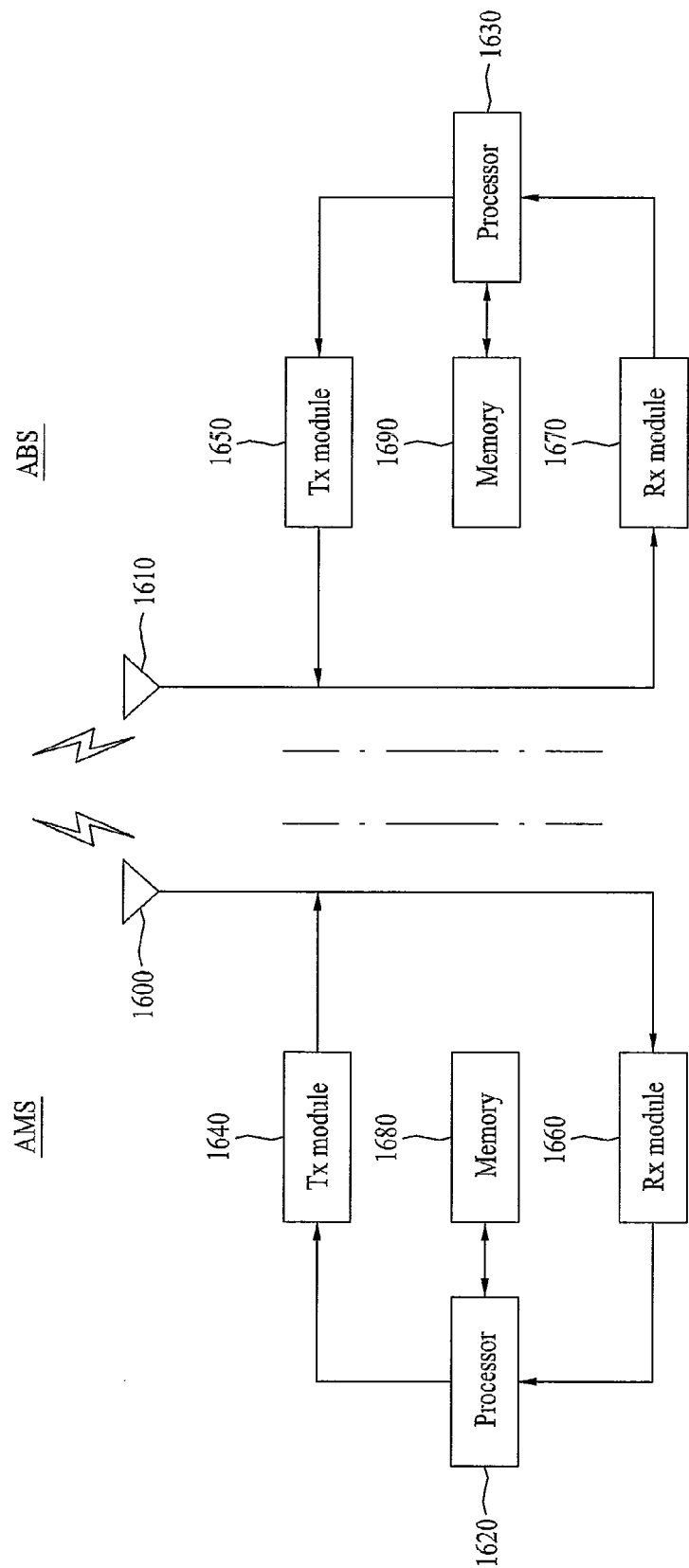
FIG. 16 is a block diagram of an MS and a Base Station (BS) for implementing the embodiments of the present invention illustrated in FIGS. 1 to 15.

FIG. 16 is a block diagram of an MS and a BS for implementing the embodiments of the present invention illustrated in FIGS. 1 to 15.

The MS operates as a transmitter on the uplink and as a receiver on the downlink. The BS operates as a receiver on the uplink and as a transmitter on the downlink.

Hence, each of the MS and the BS may include a Transmission (Tx) module 1640 or 1650 for controlling transmission of information, data and/or messages, a Reception (Rx) module 1660 or 1670 for controlling reception of information, data and/or messages, and an antenna 1600 or 1610 for transmitting and receiving the controlling transmission of information, data and/or messages. Each of the MS and the BS may further include a processor 1620 or 1630 for implementing the above-described embodiments of the present invention, and a memory 1680 or 1690 for storing procedures of the processor 1620 or 1630 temporarily or permanently.

Especially, each of the processors 1620 and 1630 may include an encryption module (or means) for encrypting MAC management messages and/or a decoding module (or means) for interpreting encrypted messages according to the embodiments of the present invention. Also, the MS and the BS illustrated in FIG. 16 each may further include a low-power Radio frequency/Intermediate Frequency (RF/IF) module.

The Tx and Rx modules 1640, 1650, 1660 and 1670 of the MS and the BS may carry out packet modulation and demodulation, high-speed packet channel coding, Orthogonal Frequency Division Multiple Access (OFDMA) packet scheduling, Time Division Duplex (TDD) packet scheduling, and/or channel multiplexing, for data transmission.

The processors 1620 and 1630 of the MS and the BS may perform an encryption control function for controlling encryption of management messages (or control signals, etc.), an HO function, an authentication and encryption function, a variable MAC frame control function, a real-time high-speed traffic control function, and/or a real-time MODEM control function.

The apparatuses illustrated in FIG. 16 may implement the methods described with reference to FIGS. 2 to 13. The embodiments of the present invention may be implemented using the components and functions of the MS and BS apparatuses.

The processor 1620 of the MS includes an encryption module for controlling encryption of management messages. The MS may perform an encryption operation using the encryption module.

The MS may negotiate a protection level with the BS by a basic capability negotiation procedure (SBC-REQ/RSP message transmission and reception, etc.). If the MS and the BS support selective encryption for management messages, the processor 1620 of the MS may control the selective control signal encryption described with reference to FIGS. 2 to 13.

If AES-CCM is applied to the selective encryption, an ICV of an encrypted MAC PDU is used for protecting the integrity of the payload of a management message. That is, the processor of the MS and/or the BS encrypts a MAC management message and attaches an ICV to the encrypted MAC management message, for the selective encryption.

If AES-CCM is not applied to the selective encryption, a CMAC tuple is included as the last attribute in the MAC management message. The CMAC may protect the integrity of the whole MAC management message. Accordingly, the processor of the MS and/or the BS generates a message authentication code (e.g. a CMAC) by hashing the MAC management message and attaching the message authentication code to the MAC management message, for integrity protection.

Also, the Rx module 1660 of the MS may receive a selectively encrypted MAC management message from the BS and provides it to the processor 1620. The processor 1620 may determine whether a MAC PDU includes a selectively MAC management message by checking an EH of the MAC PDU. If the MAC PDU includes a selectively MAC management message, the processor 1620 may decrypt the MAC management message using the encryption and/or decryption module.

The Rx module 1670 of the BS may receive a selectively encrypted MAC management message through the antenna 1610 and provide it to the processor 1630. The Tx module 1650 of the BS may transmit a selectively encrypted MAC management message to the MS through the antenna 1610.

The processor 1630 of the BS may determine whether a MAC PDU includes a selectively MAC management message by decrypting an FEH of the MAC PDU (refer to FIG. 13) and EC field in the FEH. As the processor 1630 decrypts the encrypted MAC management message, the MAC management message may be used.

The embodiments of the present invention are applicable to various wireless access systems. For example, the wireless access systems are a 3GPP system, a 3GPP2 system, and/or an IEEE 802.xx system. Besides the wireless access systems, the exemplary embodiments of the present invention are applicable to all technical fields in which the wireless access systems find their applications.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.)

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. For example, software code may be stored in the memories 1680 and 1690 and executed by the processors 1620 and 1630. The memories are located at the interior or exterior of the processors and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method of selectively protecting a medium access control (MAC) control message, the method comprising:
   receiving, via a reception unit of a reception end, a medium access control protocol data unit (MAC PDU) from a transmission end, the MAC PDU comprising a header and a payload,
   wherein the header comprises a flow identifier (FID) indicating whether or not the payload carrying the MAC control message is selectively encrypted; and
   performing, at the reception end, a decryption of the payload of the MAC PDU when the FID indicates that the payload is selectively encrypted,
   wherein the payload of the MAC PDU is selectively encrypted using one of a plurality of schemes for protecting the MAC control message,
   wherein the plurality of schemes for protecting the MAC control message comprises
      a first scheme that protects confidentiality and integrity of the MAC control message, and
      a second scheme that protects only the integrity of the MAC control message,
   wherein the MAC control message is related to a control connection, and
   wherein the MAC control message in the MAC PDU is unencrypted when the FID indicates no protection is provided.

2. The method according to claim 1, wherein the integrity of the MAC control message is protected before the confidentiality is protected according to the first scheme.

3. The method according to claim 1, wherein the integrity of the MAC control message is protected before encrypting the payload according to the first scheme.

4. The method according to claim 3, wherein the first scheme is performed based on an Advanced Encryption Standard-Counter with Cipher block Chaining Message (AES-CCM) algorithm.

5. The method according to claim 3,
   wherein the integrity of the first scheme is protected by appending an Integrity Check Value (ICV) to an end of the payload, and
   wherein the integrity of the second scheme is protected by appending a Cipher based Message Authentication Code (CMAC) to the end of the payload.

6. The method according to claim 1,
   wherein the transmission end is a mobile station and the reception end is a base station in uplink, and
   wherein the transmission end is the base station and the reception end is the mobile station in downlink.

7. An apparatus for selectively protecting a medium access control (MAC) control message, the apparatus comprising:
   a reception unit configured to receive the MAC control message; and
   a processor configured to perform decryption of the MAC control message, wherein the apparatus is configured to receive a medium access control protocol data unit (MAC PDU) comprising a header and a payload from a transmission end via the reception unit, wherein the header comprises a flow identifier (FID) indicating whether or not the payload carrying the MAC control message is selectively encrypted, wherein the processor is further configured to perform decryption of the payload of the MAC PDU when the FID indicates that the payload is encrypted, wherein the payload of the MAC PDU is encrypted using one of a plurality of schemes for protecting the MAC control message, wherein the plurality of schemes for protecting the MAC control message comprises
- a first scheme that protects confidentiality and integrity of the MAC control message, and
- a second scheme that protects only the integrity of the MAC control message, wherein the MAC control message is related to a control connection, and wherein the MAC control message in the MAC PDU is unencrypted when the FID indicates no protection is provided.

8. The apparatus according to claim 7, wherein the integrity of the MAC control message is protected before the confidentiality is protected according to the first scheme.

9. The apparatus according to claim 7, wherein the integrity of the MAC control message is protected before encrypting the payload according to the first scheme.

10. The apparatus according to claim 9, wherein the first scheme is performed based on an Advanced Encryption Standard-Counter with Cipher block Chaining Message (AES-CCM) algorithm.

11. The apparatus according to claim 9,
wherein the integrity of the first scheme is protected by appending an Integrity Check Value (ICV) to an end of the payload, and
wherein the integrity of the second scheme is protected by appending a Cipher based Message Authentication Code (CMAC) to the end of the payload.

12. The apparatus according to claim 7,
wherein the apparatus is a mobile station in uplink, and
wherein the apparatus is a base station in downlink.

* * * * *